(12) United States Patent
Hooe et al.

(10) Patent No.: US 10,991,192 B2
(45) Date of Patent: Apr. 27, 2021

(54) COMMERCIAL GRANULAR MATERIAL DISPENSING APPARATUS, METHOD, AND SYSTEM

(71) Applicant: Pinch Corp., Santa Monica, CA (US)

(72) Inventors: Dylan Cole Hooe, Santa Monica, CA (US); Sarah Budhiman, Santa Monica, CA (US)

(73) Assignee: Pinch Corp., Santa Monica, CA (US)

( * ) Notice: Subject to any disclaimer, the term of this patent is extended or adjusted under 35 U.S.C. 154(b) by 28 days.

(21) Appl. No.: 15/970,908

(22) Filed: May 4, 2018

(65) Prior Publication Data

US 2019/0180552 A1  Jun. 13, 2019

Related U.S. Application Data

(60) Provisional application No. 62/596,299, filed on Dec. 8, 2017.

(51) Int. Cl.
| | |
|---|---|
| *G07F 11/44* | (2006.01) |
| *A47F 1/035* | (2006.01) |
| *G07F 13/02* | (2006.01) |
| *G07F 13/10* | (2006.01) |
| *G06Q 20/14* | (2012.01) |
| *G06Q 20/18* | (2012.01) |

(52) U.S. Cl.
CPC ............. *G07F 11/44* (2013.01); *A47F 1/035* (2013.01); *G06Q 20/145* (2013.01); *G06Q 20/18* (2013.01); *G07F 13/025* (2013.01); *G07F 13/10* (2013.01)

(58) Field of Classification Search
None
See application file for complete search history.

(56) References Cited

U.S. PATENT DOCUMENTS

| | | | |
|---|---|---|---|
| 9,052,228 B2 | 6/2015 | Lee | |
| 9,591,943 B2 | 3/2017 | Murray | |
| 2012/0065774 A1 | 3/2012 | Peretz | |
| 2015/0135966 A1* | 5/2015 | Hulett | A47J 31/404 99/289 R |
| 2016/0055599 A1* | 2/2016 | Illy | A47J 31/4414 705/15 |
| 2017/0238753 A1 | 8/2017 | Merali | |

(Continued)

*Primary Examiner* — Hemant Desai
*Assistant Examiner* — Tanzim Imam
(74) *Attorney, Agent, or Firm* — Schott, P.C.

(57) ABSTRACT

A device, system, and method are provided for grinding, dispensing, and packaging a granular material into a receptacle to be obtained by a user. The device can include: a user interface; a canister comprising a dispensing mechanism and a grinder; a packaging system configured to physically manipulate and position a receptacle within the device, thereby eliminating the need for manual handling by the user; a receptacle-storage configured to house a plurality of receptacles and from which the packaging system can obtain a receptacle; a capping station configured to apply a covering onto a filled receptacle to prevent spillage and waste; an inventory database to store inventory information; a communication system to facilitate internet connectivity; and a recommendation system to recommend various recipes to the user. The description also discloses a system of interconnected kiosks for automatically grinding, dispensing, and packaging granular materials.

12 Claims, 18 Drawing Sheets

(56) References Cited

U.S. PATENT DOCUMENTS

| | | | | |
|---|---|---|---|---|
| 2018/0153332 A1* | 6/2018 | Abbiati | .................... | A47J 42/42 |
| 2019/0320842 A1* | 10/2019 | De'Longhi | ............. | A47J 31/52 |
| 2020/0029739 A1* | 1/2020 | Van Hoek | ............. | G07F 13/025 |

\* cited by examiner

FIGURE 2
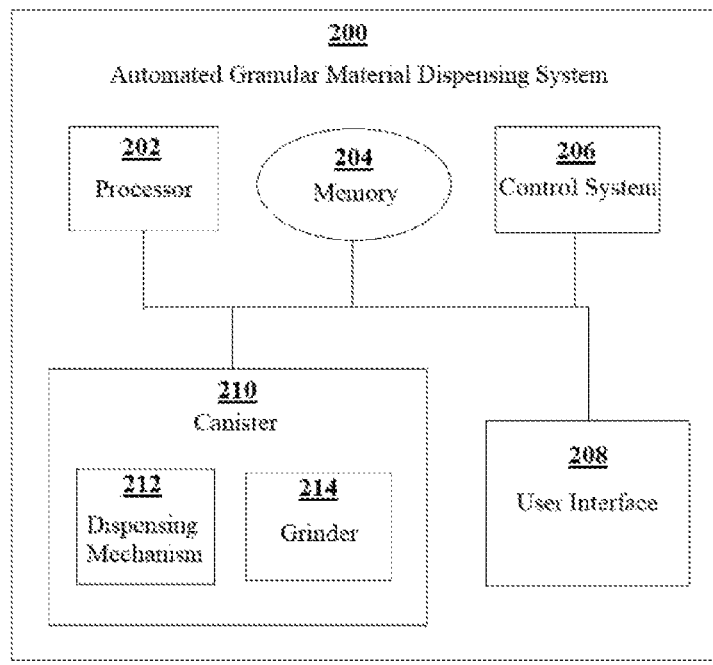
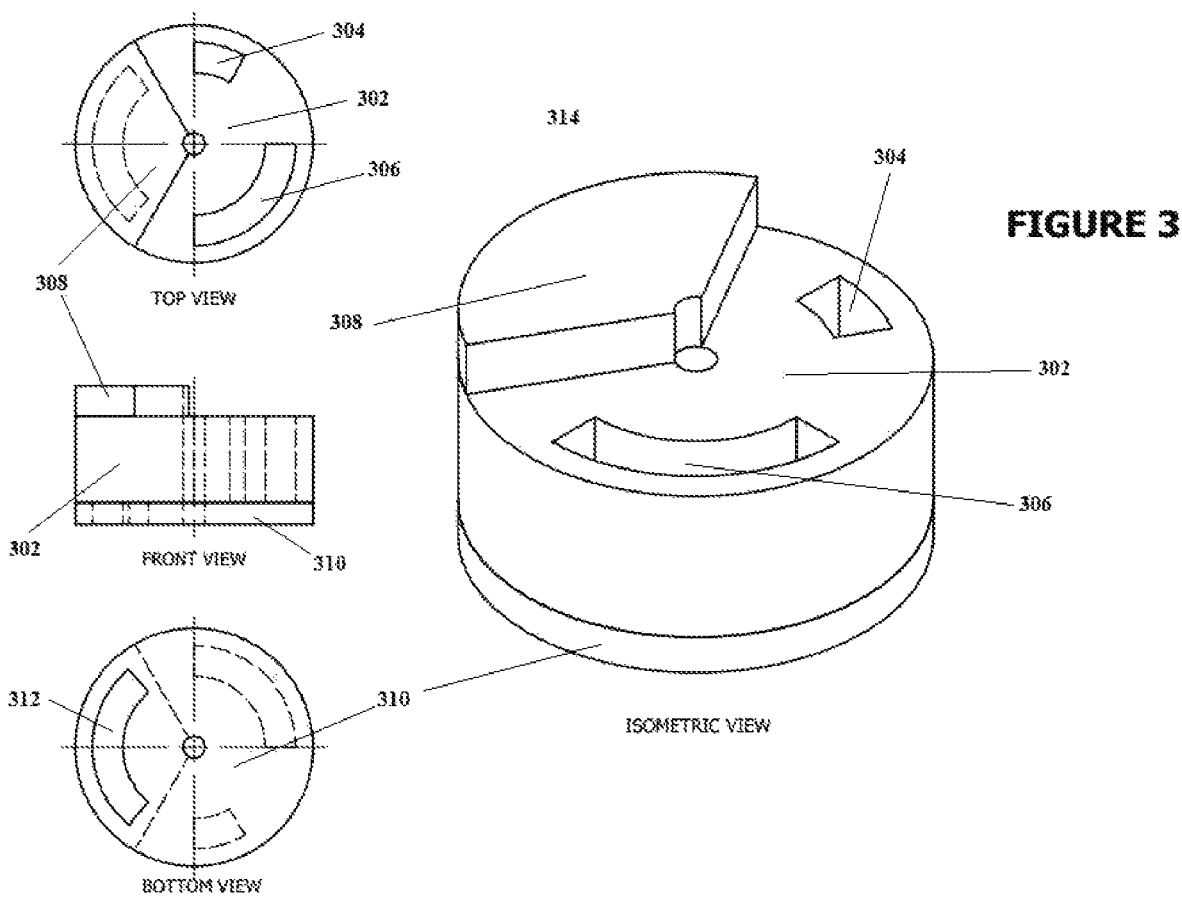
FIGURE 3

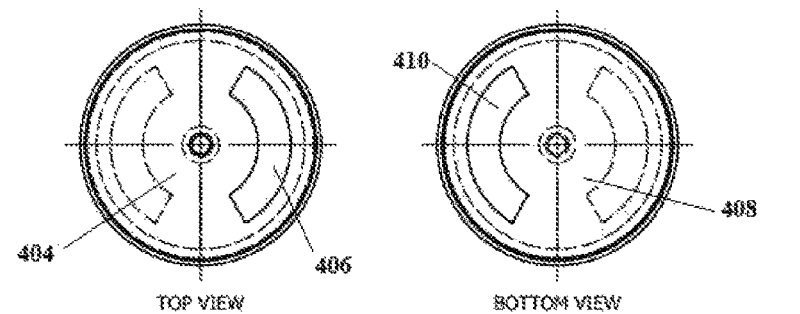
FIGURE 4
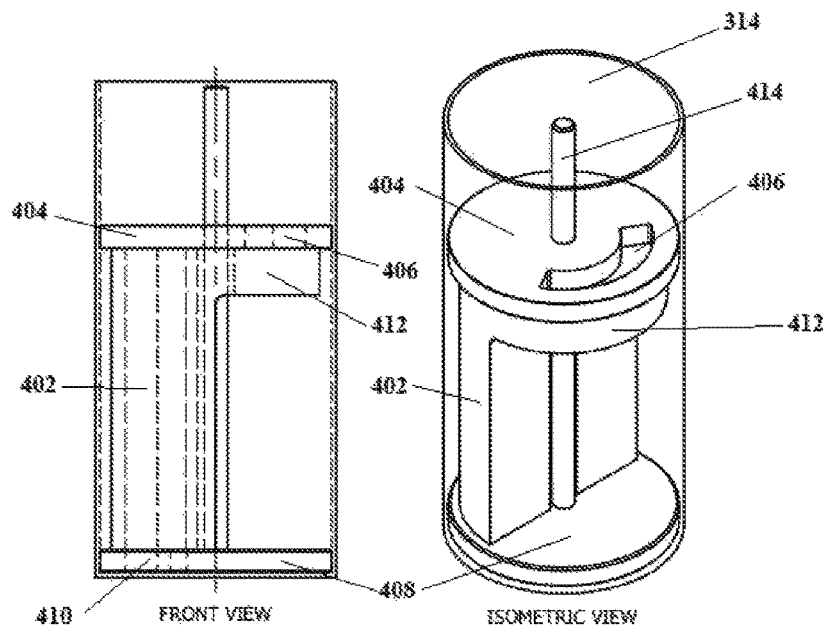
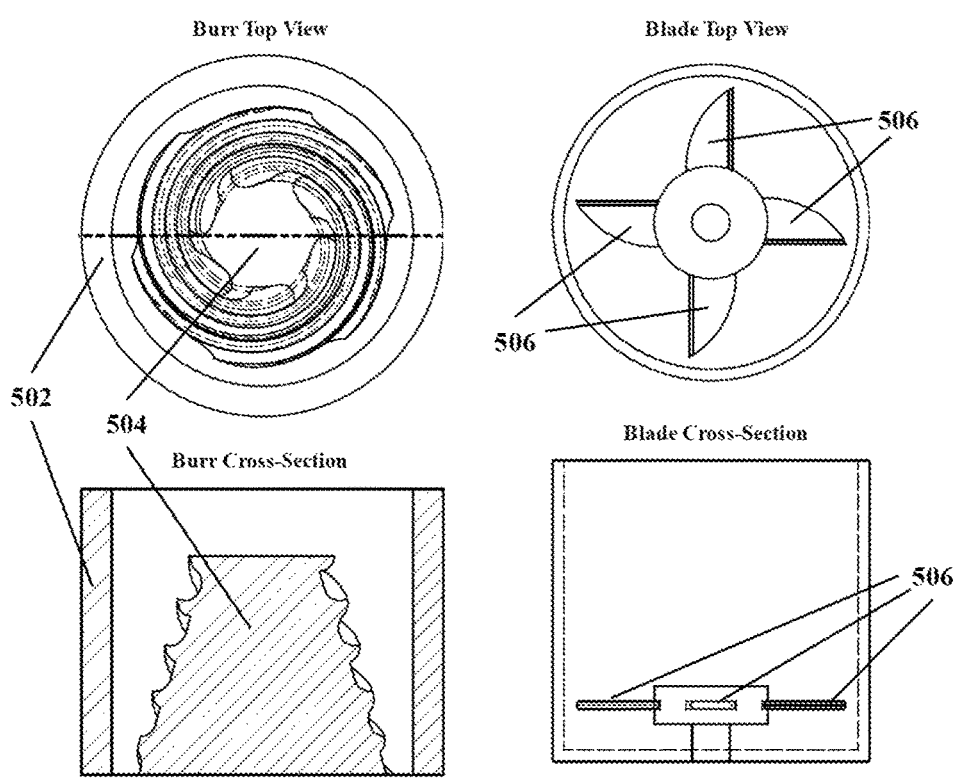
FIGURE 5

FIGURE 9
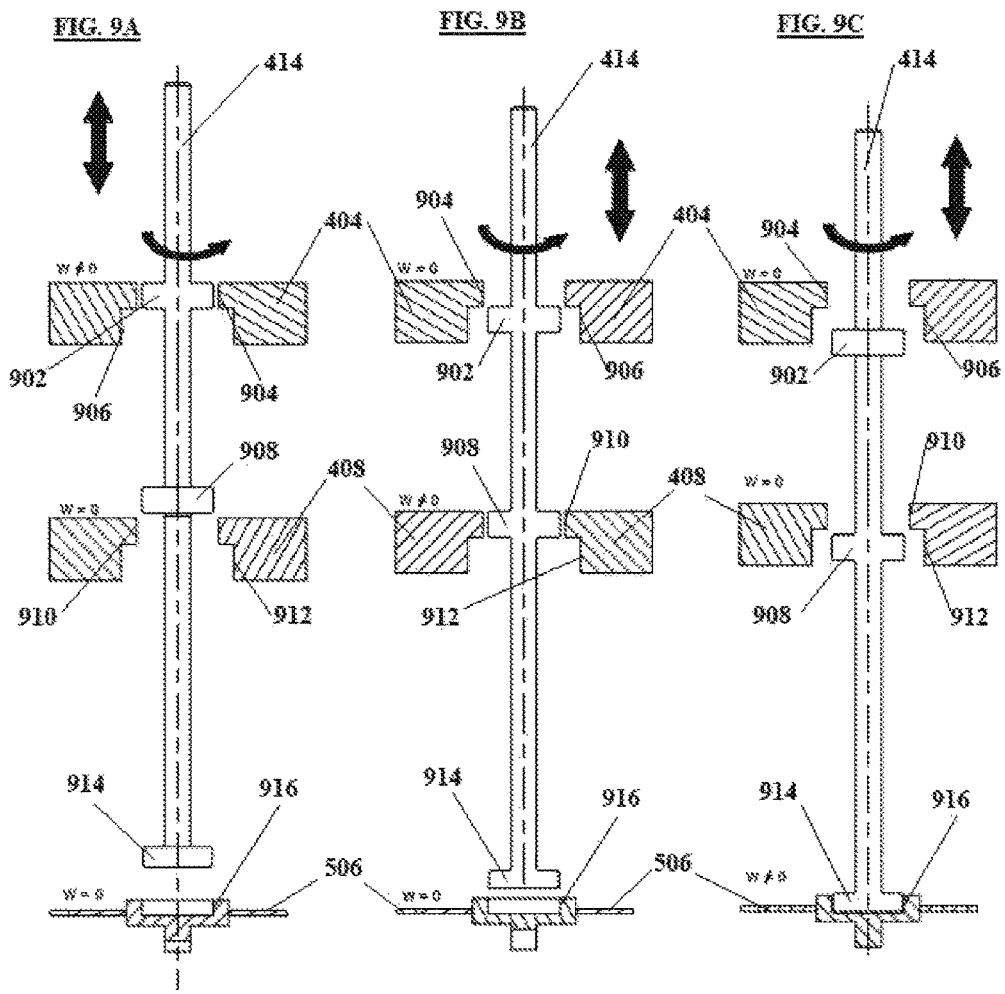
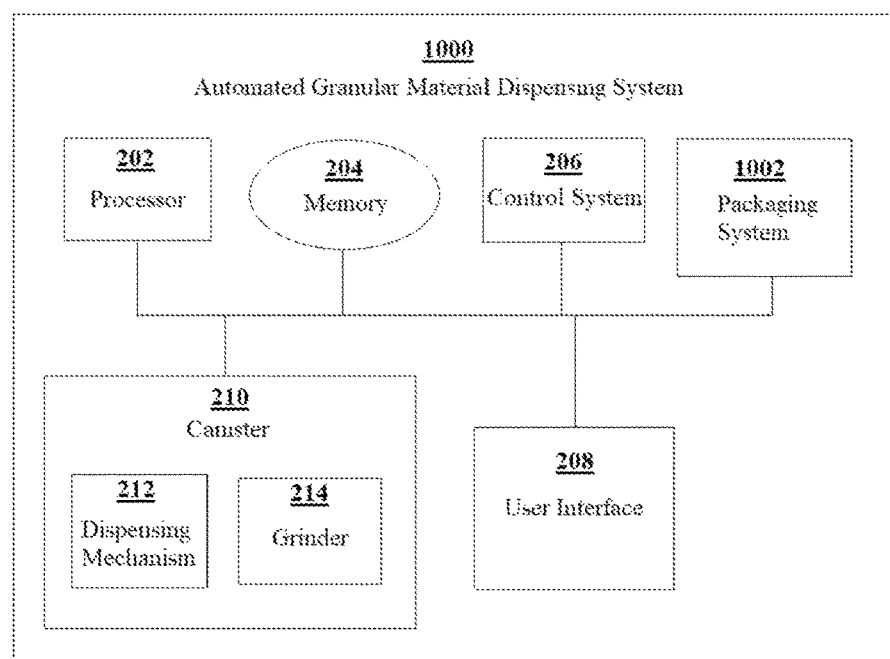

FIGURE 11
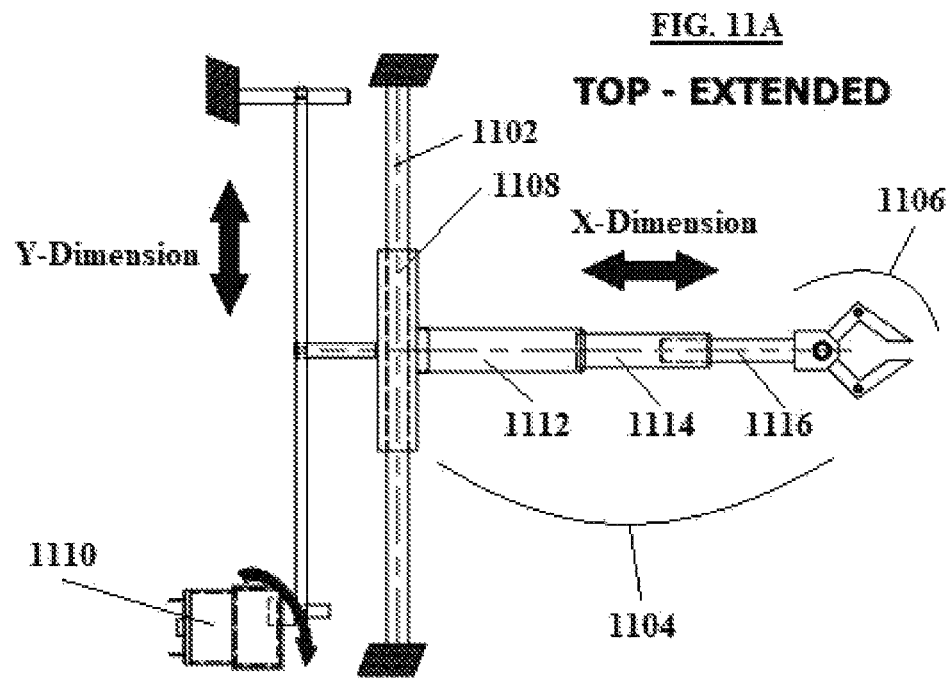
FIG. 11A
TOP - EXTENDED
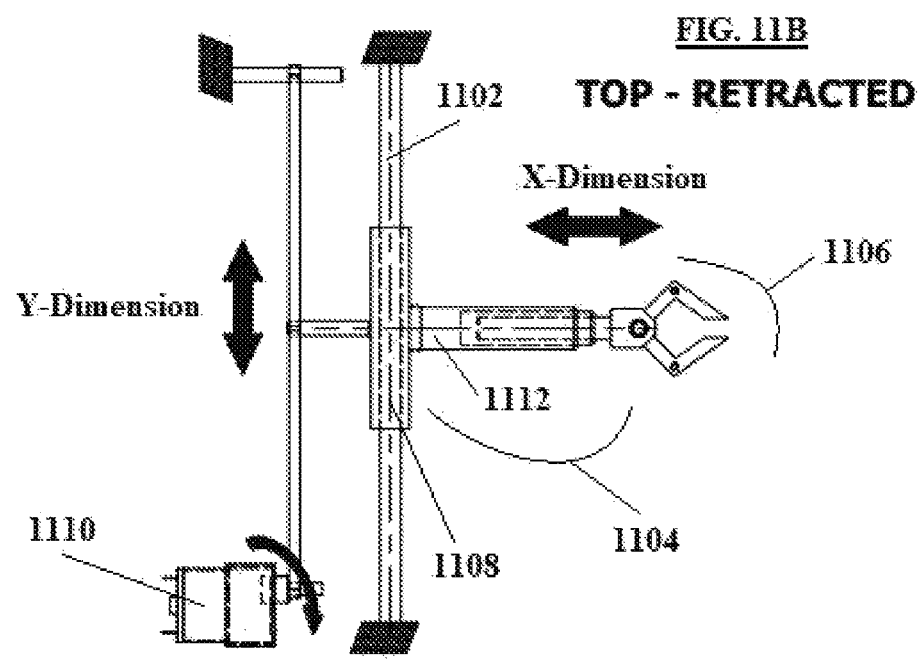
FIG. 11B
TOP - RETRACTED

FIGURE 13
TOP VIEW
FIG. 13A
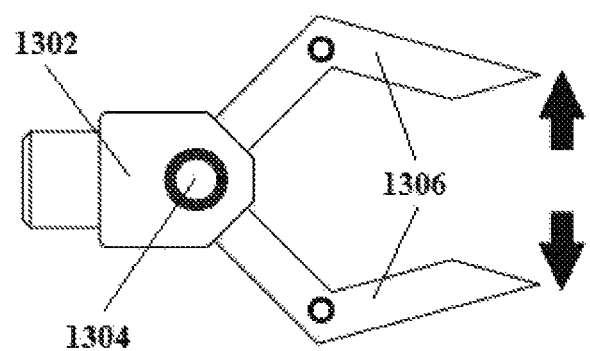
FIG. 13B
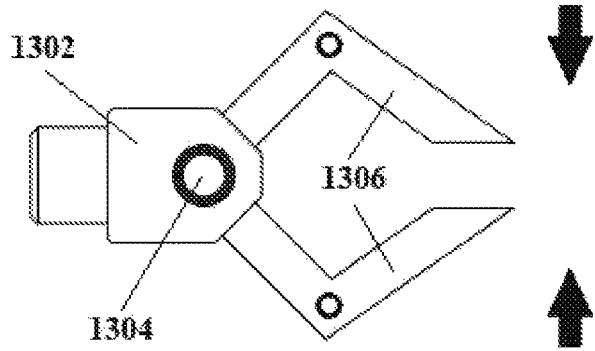

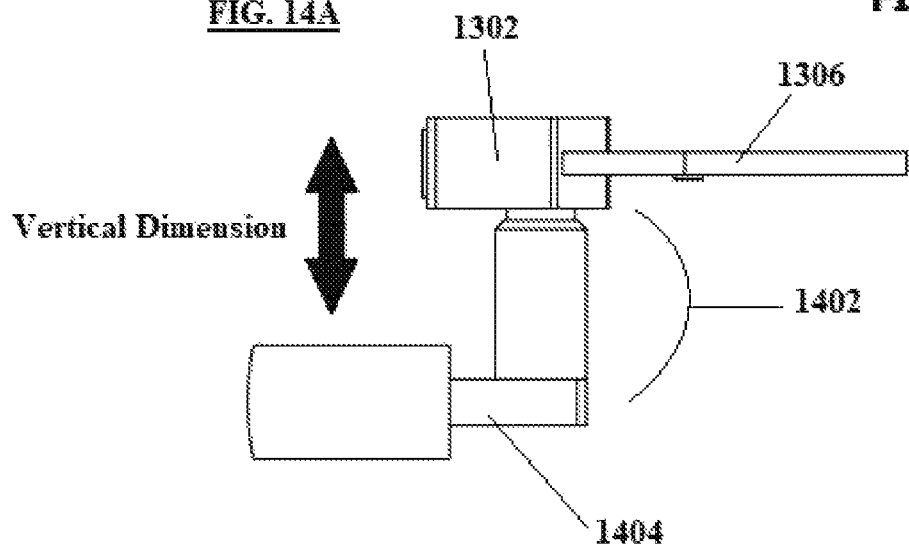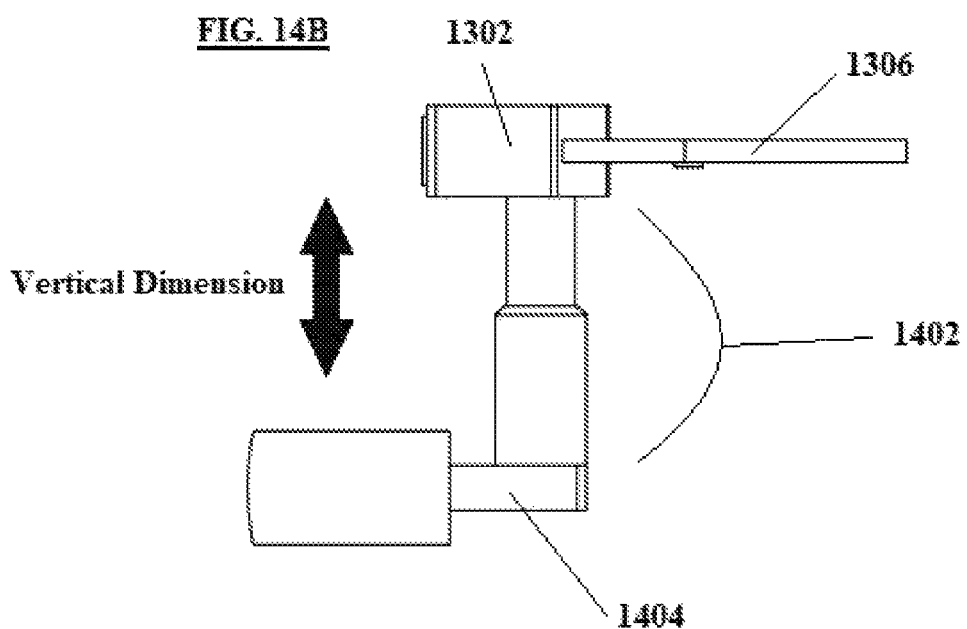
FIGURE 14

FIGURE 15
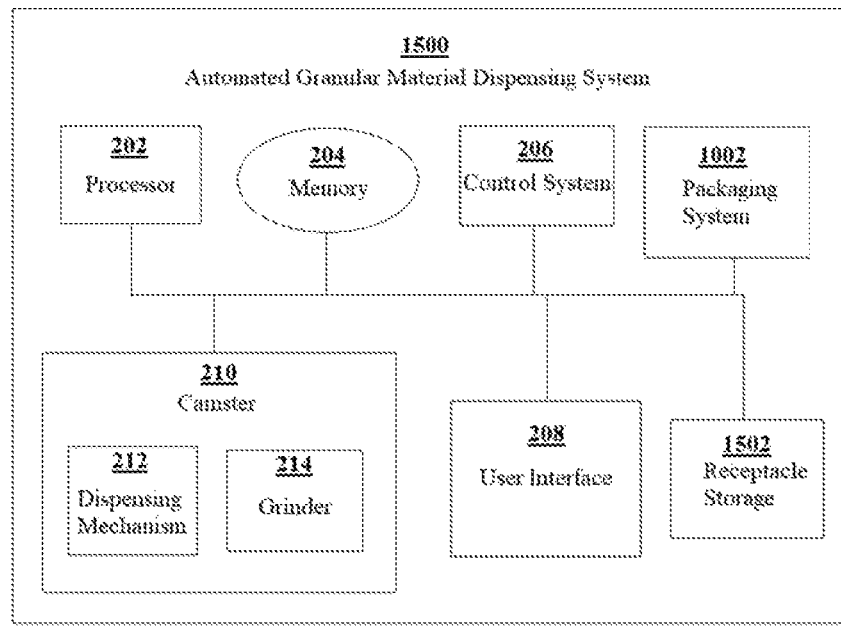
FIGURE 16
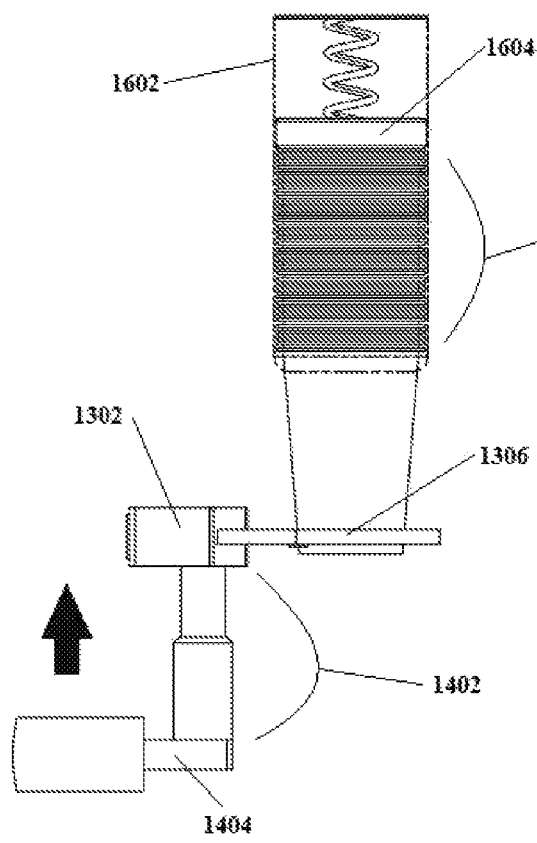
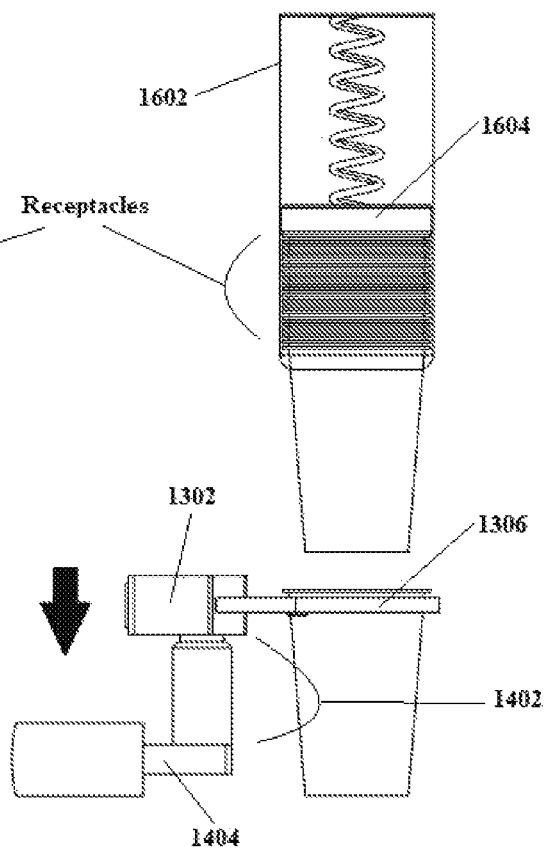

FIGURE 17
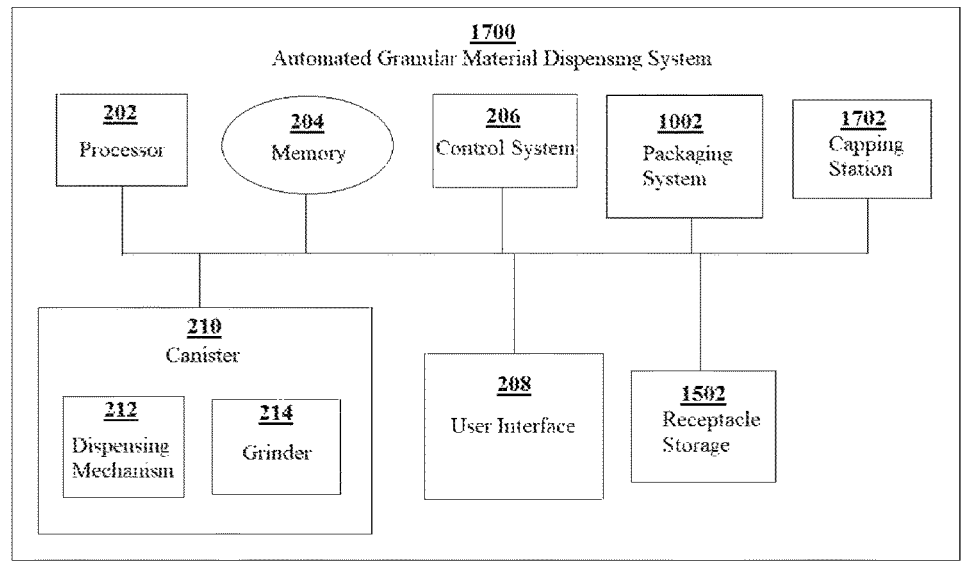
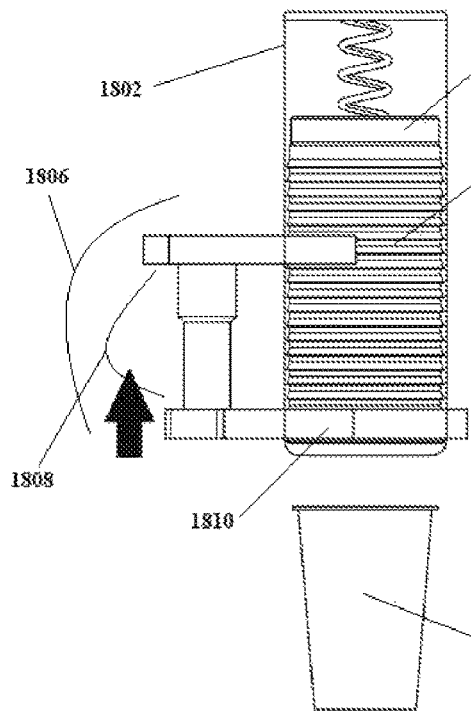
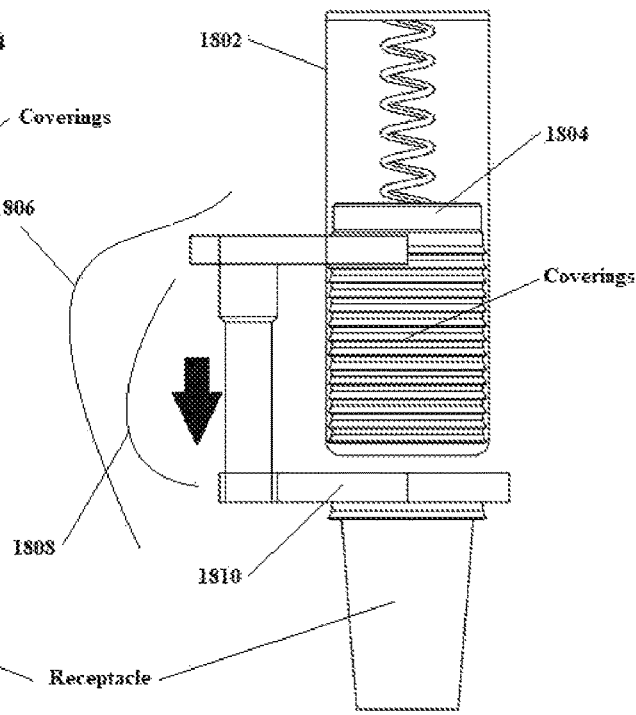
FIGURE 18

FIGURE 19
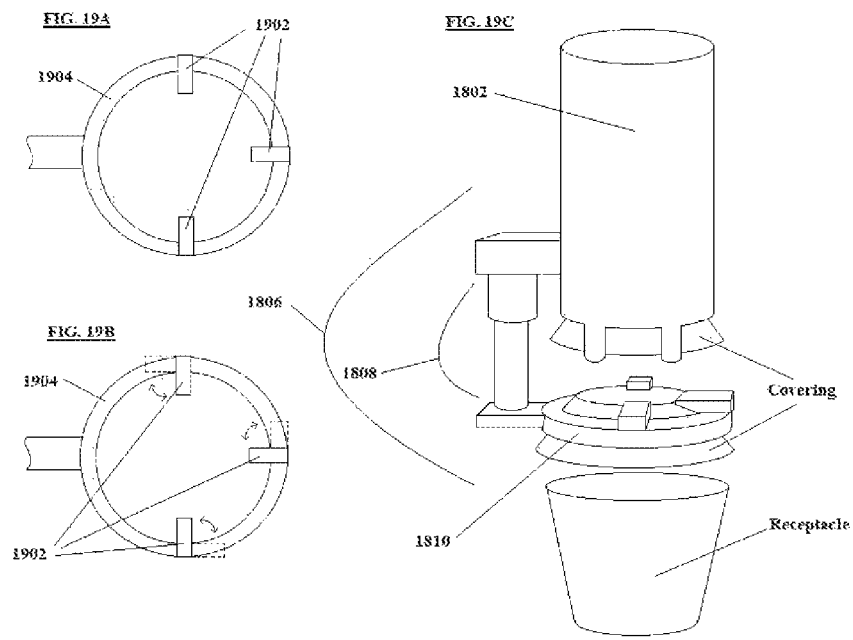
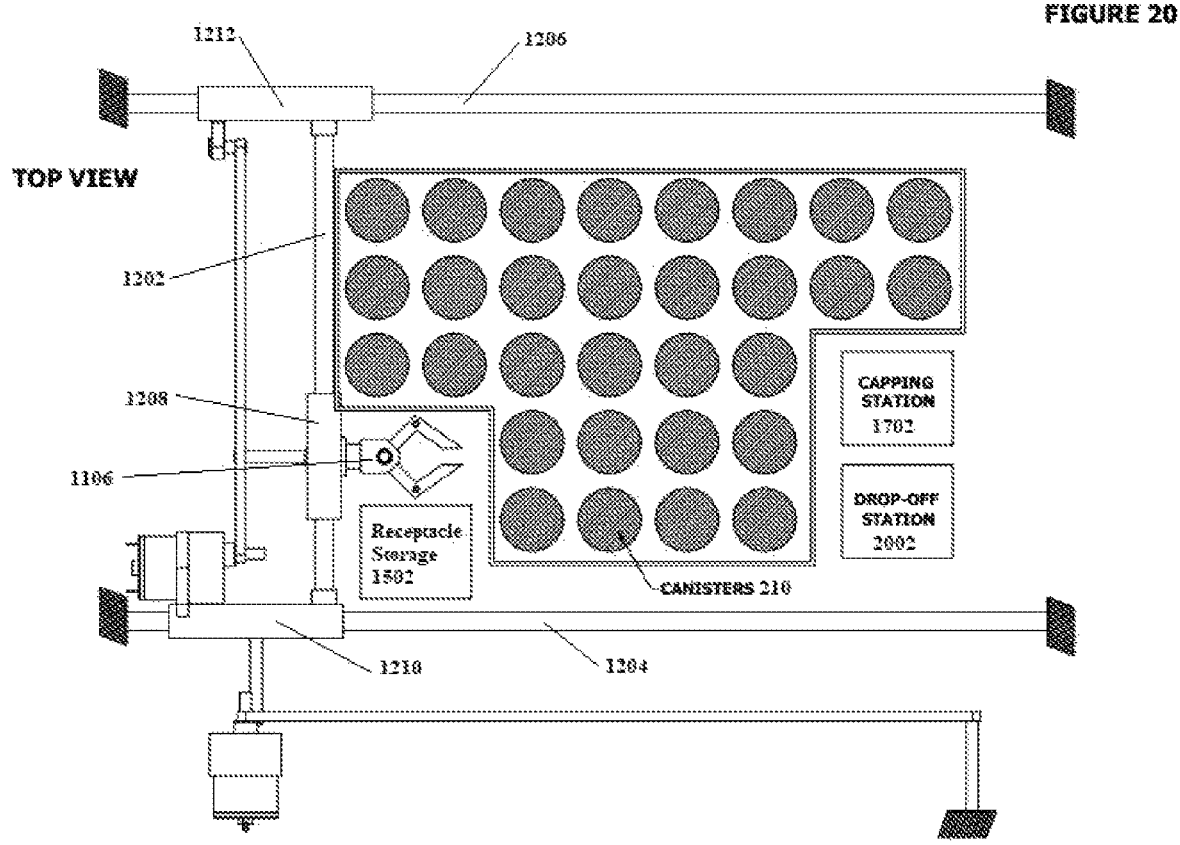
FIGURE 20

2602
User remotely accesses Central Server (e.g. via internet, cloud, local area network, etc.)

2604
User accesses Master Inventory Database via Central Server to check available inventory at each kiosk

2606
User remotely designates a kiosk and places order (e.g. type and quantity of spice) via Central Server

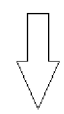

2608
Designated kiosk dispenses user's order, and user travels to kiosk to obtain said order

COMMERCIAL GRANULAR MATERIAL DISPENSING APPARATUS, METHOD, AND SYSTEM

BACKGROUND

Consumers benefit by having the option to purchase goods in desired or needed quantities. Conversely, consumers suffer if the fixed quantities of commercial goods are significantly more or less than the amounts that they need or desire. This is especially true with regard to granular food products (e.g. spices, seasonings, flour, sugar, coffee beans, candy, seeds, nuts, powders, tea leaves, and so on). For example, a consumer may require only a few teaspoons of cinnamon, but their local grocery store may offer only multi-ounce, prepackaged containers of cinnamon. In such case, the consumer would be forced to purchase much more cinnamon than they desired, resulting in excess expense for the consumer and likely in eventual waste of the unused cinnamon.

The advent of bulk food sections in grocery stores helped to address this problem. In bulk food sections, consumers can manually fill receptacles with desired amounts of granular materials. Unfortunately, because bulk food sections rely on manual measurement and dispensation, they are susceptible to several problems, including: inconsistent measuring and dispensation; contamination of unpurchased granular materials caused when consumers cough or sneeze near open bulk food containers; excessive waste caused by consumers spilling purchased or unpurchased amounts of granular materials; cross-contamination between different types of granular materials; and so on. Moreover, bulk food sections store pre-ground granular materials. Because ground food products lose freshness more quickly than unground food products, bulk food sections suffer from excessive spoliation of inventory.

Automated dispensers known in the art do not adequately address these concerns. Such automated dispensers may provide for more consistent measuring and dispensation, and they may prevent contamination of inventory by coughing or sneezing of users. However, known automated dispensers generally do not automatically package dispensed amounts of granular materials; instead, they require manual packaging (e.g. requiring a user to manually put a cap/covering over a receptacle containing a dispensed amount of granular material), which increases the risk of spillage and waste. Moreover, known automated dispensers generally use a centralized dispensing mechanism or funnel/chute through which all dispensed materials pass. Thus, if the automated dispenser is configured to dispense more than one type of granular material, cross-contamination between the different types of granular materials persists. Further still, known automated dispensers generally dispense only pre-ground food products, and so they still suffer from excessive spoliation due to quick loss of freshness.

BRIEF SUMMARY

It is an object of the present invention to address these problems in the art.

The present invention pertains to systems, methods, and computer-readable media for the automatic dispensation, grinding, and packaging of granular material. A device for automatically grinding and dispensing granular material may include: a user interface for receiving user input identifying a type and/or quantity of material to be dispensed; at least one canister for storing, grinding, and dispensing the type and quantity of material, which canister comprises a dispensing mechanism configured to measure and dispense the type and quantity of material and a grinder configured to grind the type and quantity of material; and a control system configured to control operation of the device. The incorporation of a grinder allows for the device to store unground material, which spoils at a slower rate than ground material.

In one or more embodiments, the device can comprise a packaging system configured to position a receptacle beneath the at least one canister, which eliminates the need for the user to manually handle a receptacle during dispensation, thereby significantly reducing the likelihood of spillage and waste.

In one or more embodiments, the device can comprise a receptacle-storage that is configured to house a plurality of canisters and from which the packaging system can obtain a receptacle. This further removes the need for manual handling of a receptacle.

In one or more embodiments, the device can comprise a capping station that is configured to apply a covering onto a filled receptacle, thereby further eliminating the need for manual handling and significantly reducing the chance of spillage and waste.

In one or more embodiments, the device can comprise an inventory database that is configured to store inventory information of the device.

In one or more embodiments, the device can comprise a communication system that is configured to facilitate internet connectivity, thereby allowing a user to remotely check the device's inventory and to remotely place an order.

In one or more embodiments, the communication system can be configured to send an alert to a designated maintenance entity when an inventory of the device has been depleted.

In one or more embodiments, the device can comprise a recommendation system that is configured to recommend to the user a recipe that requires a granular material currently in stock in the device.

The present invention also pertains to a system of interconnected kiosks for grinding, dispensing, and packaging granular material. The system can comprise: a central server; a plurality of kiosks for grinding, dispensing, and packaging granular material that are remote from each other, and each of which is in communication with the central server; a master inventory database in communication with the central server that stores inventory information of the entire system of interconnected kiosks; and a communication system that facilitates internet connectivity, thereby allowing the user to remotely access the system to check the inventory of each kiosk and to place an order.

In one or more embodiments, each kiosk can be configured as the device described above.

In one or more embodiments, the communication system can be configured to alert a designated maintenance entity when an inventory of any kiosk in the system has been depleted.

The present invention also pertains to a non-transient computer-readable medium containing computer-executable instructions which, when executed by a processor, cause an automated device to perform the following steps: accepting user input for an order of granular material; actuating a packaging system to position a receptacle beneath the appropriate canister; actuating a dispensing mechanism within the canister; actuating a grinder also within the canister; and actuating a capping station to apply a covering onto the receptacle after it has been filled with the dispensed and ground material.

BRIEF DESCRIPTION OF DRAWINGS

The present invention is more fully understood from the detailed description below, read in conjunction with the accompanying figures. In the figures, embodiments of the invention are illustrated by way of example, with such examples being thoroughly explained in the detailed description. It is to be expressly understood that the figures and the detailed description are for exemplary purposes and are not to be read as constraining the scope of the present disclosure. Now, consider the figures, wherein like numerals refer to like elements throughout:

FIG. 2 illustrates a schematic block diagram of an automated dispenser and grinder;

FIG. 3 illustrates top, front, bottom, and isometric views of a rotary-shuttle dispensing mechanism;

FIG. 4 illustrates top, front, bottom, and isometric views of an alternate rotary-shuttle dispensing mechanism;

FIG. 5 illustrates top and side views of burr and blade grinders;

FIGS. 9A, 9B, and 9C illustrate profile views of a gear shift mechanism of an assembled canister;

FIG. 10 illustrates a schematic block diagram of an automated dispenser and grinder, comprising a packaging system;

FIGS. 11A and 11B illustrate top views of a packaging system;

FIGS. 13A and 13B illustrate top views of an end-effector;

FIGS. 14A and 14B illustrate side views of an end-effector configured for vertical motion;

FIG. 15 illustrates a schematic block diagram of an automated dispenser and grinder, comprising a receptacle storage;

FIGS. 16A and 16B illustrate side views of an end-effector interacting with a receptacle storage;

FIG. 17 illustrates a schematic block diagram of an automated dispenser and grinder, comprising a capping station;

FIGS. 18A and 18B illustrate side views of a capping station;

FIG. 19 illustrates a perspective view of a capping station and a capping-end-effector;

FIG. 20 illustrates an aerial schematic of an automated dispenser and grinder;

FIG. 26 illustrates a flow chart diagram of a remote ordering and dispensation process.

DETAILED DESCRIPTION

Certain embodiments of the present invention are described below to enable one of ordinary skill in the art to make and use the present invention without undue experimentation. The described embodiments help to provide an overall understanding of the structures, functions, and principles underlying the present invention. It is to be expressly understood that such embodiments are exemplary only and should not be read as constraining the scope of the present disclosure.

Moreover, the embodiments described herein are implemented by particular physical machines and particular configurations of computer hardware, including computing devices, servers, receivers, transmitters, processors, memories, displays, and networks. As such, the embodiments described herein are intrinsically related to particular machines and their uses, and such embodiments have no meaning or practical applicability outside their use with machines, computer hardware, and other physical components.

The present disclosure in one or more embodiments describes processes and/or devices configured for automatically dispensing, grinding, and/or packaging granular materials into a receptacle to be obtained by a user. Although the present disclosure may specifically discuss the present invention's applicability to automatically dispensing, grinding, and/or packaging granular food products (e.g. spices, seasonings, flour, sugar, coffee beans, candy, seeds, nuts, powders, tea leaves, and so on), it is to be expressly understood that the present disclosure can be equally well implemented to automatically dispense, grind, and/or package any type of material that can be ground, whether or not edible.

Figure 1:
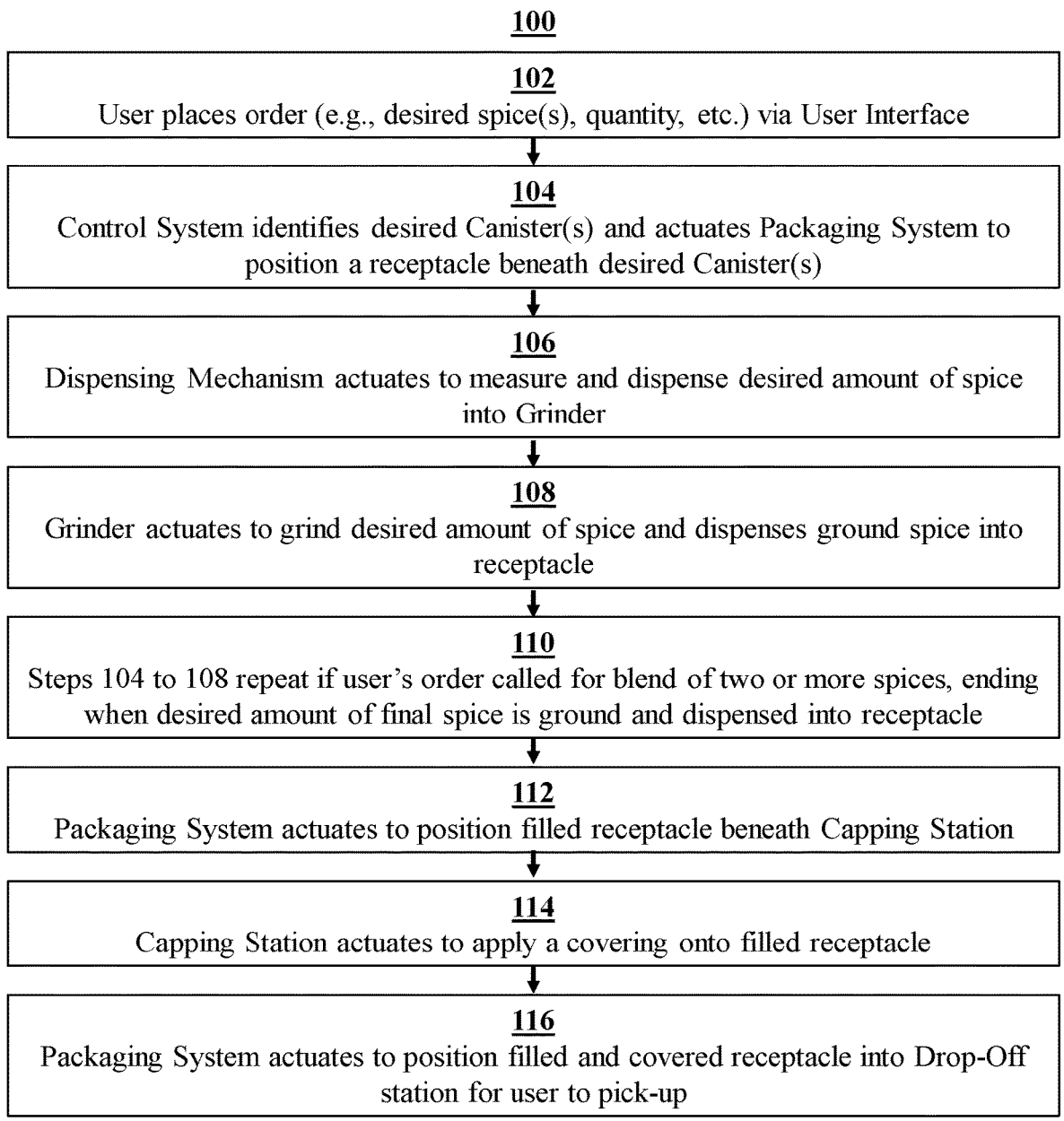
FIG. 1 illustrates a flow chart diagram of a dispensation process.

FIG. 1 illustrates a flow chart diagram of a dispensation process, to be implemented by a dispensing device. At step 102, a user interacts with a user interface communicatively connected to a control system in the dispensing device to place an order for a desired granular material to be dispensed. The user's order can identify a type of granular material to be dispensed. For example, if the dispensing device is configured to dispense more than one type of granular material (e.g. cinnamon, cumin, and ginger), the user can interact with the user interface to select a desired granular material (e.g. cinnamon) to be dispensed by the dispensing device. In other embodiments, the user's order can identify a quantity of a material to be dispensed. For example, if the dispensing device is configured to dispense only one type of granular material (e.g. cinnamon), the user can interact with the user interface to select a desired amount (e.g. two tablespoons) of that granular material to be dispensed by the dispensing device. In still other embodiments, the dispensing device can be configured to dispense more than one type of granular material and in various quantities, and so the user can interact with the user interface to identify both a type and quantity of a desired granular material to be dispensed. In one or more embodiments, the user interface can be any device and/or system now known or later created in the art that is configured to receive tactile, visual, audible, and/or other user input (e.g. buttons, keypads, keyboards, touchscreens, joysticks, microphones, cameras, lasers, RFID sensors, interactive displays, and so on).

At step 104, the control system receives the user's order, inputted via the user interface, and identifies a canister containing the desired granular material within the dispensing device. In some embodiments, the control system can then actuate a packaging system within the dispensing device that is configured to place a receptacle beneath the appropriate canister in order to receive the granular material upon dispensation. For example, a dispensing device may dispense cinnamon, cumin, and ginger. Each spice could be housed in a separate canister (to prevent cross-contamination). If a user places an order for three teaspoons of ginger, the control system will identify the location of the canister containing ginger and then actuate the packaging system to place a receptacle (e.g. a cup) beneath the ginger canister so that the receptacle can receive the dispensed amount of ginger. Although the packaging system is optional, the incorporation of such a packaging system eliminates the need for the user to manually manipulate the receptacle, thereby significantly reducing the risk of spillage and waste. The control system can be any type of computing device/processor now known or later created in the art that can execute computer-executable instructions, which instructions govern the operation of the dispensing device. In one or more embodiments, the control system can identify the appropriate canister by accessing a computer-readable memory in which are stored the separate locations and contents of the various canisters in the dispensing device. The control system may also identify the appropriate canister in real-time by: actuating a bar-code scanner to scan bar-codes located on the canisters until the desired bar-code is detected; actuating an RFID sensor to sense RFID-tags on the canisters until the desired tag is detected; and so on. One of ordinary skill in the art will appreciate that other ways of implementing this step exist. The packaging system is explained in detail below in conjunction with FIG. 10 to FIG. 14.

At step 106, the control system actuates a dispensing mechanism within the canister that is configured to measure and dispense the desired amount of granular material into a grinder within the canister. To continue the previous example, the ginger canister would contain a repository of unground ginger. The control system would instruct the dispensing mechanism (which is within the ginger canister) to dispense a measured amount of unground ginger into the grinder (also within the ginger canister), such that the measured amount of unground ginger yields three teaspoons of ground ginger after grinding. The dispensing mechanism is explained in detail below in conjunction with FIG. 3 and FIG. 4.

At step 108, the control system actuates the grinder to grind the desired amount of granular material and to dispense the ground granular material into the receptacle. To continue the previous example, once the dispensing mechanism is finished dispensing the measured amount of unground ginger into the grinder, the control system could instruct the grinder to begin grinding. Upon completion of grinding, three teaspoons of ground ginger would result and be dispensed into the receptacle. The incorporation of grinding into the process allows for unground materials to be stored in the canisters. Since unground materials spoil at a slower rate than ground materials, the grinding step enhances the shelf-life of stored materials, thereby constituting a significant improvement in the art. The grinder is explained below in conjunction with FIG. 5.

At step 110, step 104 to step 108 can be optionally repeated if the user's order calls for a blend of two or more different types of granular materials, with the repetition ending once the desired amount of the final desired type of granular material is ground and dispensed into the receptacle. For example, if the user orders a spice blend containing one teaspoon of cumin and two teaspoons of cinnamon, step 104 to step 108 could be carried out twice: once so that the receptacle is placed beneath the cumin canister to receive the one teaspoon of ground cumin, and once more so that the receptacle is then placed beneath the cinnamon canister to receive the two teaspoons of ground cinnamon. The result would be one receptacle containing the entire three-teaspoon blend of cumin and cinnamon.

At step 112, the control system may actuate the packaging system to move the receptacle from underneath a canister and to place the receptacle beneath a capping station within the dispensing device. As mentioned above, this eliminates the need for a user to manually manipulate a filled and open receptacle, thereby significantly reducing the risk of spillage and waste. Again, the packaging system is explained more fully below.

At step 114, the control system actuates the capping station to apply a covering onto the filled receptacle. Continuing the previous example, once the cumin-cinnamon blend has been completely ground and dispensed into the receptacle, the packaging system could move the receptacle out from underneath the most recently used canister and could place the receptacle beneath the capping station. The capping station could then apply a covering (e.g. cap, lid, plastic wrap, and so on) onto the filled receptacle. The capping station is explained in detail below in conjunction with FIG. 17 to FIG. 19.

Lastly, at step 116, the control system actuates the packaging system to position the filled and covered receptacle into a drop-off station within the dispensing device for the user to obtain. To continue the previous example, once the capping station applies a lid to the filled receptacle containing the cumin-cinnamon blend, the packaging system could move the filled and covered receptacle from the capping station and could place the receptacle in the drop-off station (e.g. a designated area within the dispensing device that is open to the user). Then, the user simply could grab the filled and covered receptacle and continue with their day. Those of ordinary skill in the art will appreciate that this step can optionally be eliminated if the capping station itself is already open to the user.

The process illustrated by FIG. 1 describes the steps that could be performed to fill a single receptacle with one or more granular materials. The process can be repeated multiple times if multiple, separate receptacles are ordered by the user.

The dispensing device can be implemented without a capping station, thereby nullifying Step 112 and Step 114. In other examples, the dispensing device can be implemented without a packaging system, thereby nullifying Step 104 and Step 116. In such case, the receptacle may be manually placed beneath a desired canister. These and other aspects of the process in FIG. 1 can be altered without departing from the scope of the present disclosure.

FIG. 2 illustrates a schematic block diagram of an automated dispenser and grinder. As shown, Automated Granular Material Dispensing System 200 (hereafter referred to as "device 200") comprises a memory 204 for storing computer-executable instructions and a processor 202 for executing the computer-executable instructions. One of ordinary skill in the art will appreciate that these computer-executable instructions can enable the operations of device 200 and its subcomponents. Furthermore, device 200 can, in one or more embodiments, comprise a casing (not illustrated in FIG. 2) to house its subcomponents.

Device 200 further comprises control system 206, user interface 208, and canister 210 having dispensing mechanism 212 and grinder 214. Control system 206 corresponds to the control system discussed above in conjunction with FIG. 1. As mentioned above, control system 206 can, in one or more embodiments, comprise appropriate computer hardware and/or software so as to implement the process described in FIG. 1 or variations of that process. In one or more embodiments, control system 206 functions as the "brain" of device 200. In such case, control system 206 executes a computer-executable protocol calling for: acquisition of user input via user interface 208; actuation of dispensing mechanism 212 so as to isolate a measured amount of unground material from canister 210; and actuation of grinder 214 so as to grind the measured amount of unground material, thereby yielding the desired amount of ground material indicated by the user input. Additional components of an automated dispenser and grinder discussed in this disclosure can be operated and/or controlled by control system 206.

User interface 208 is the component with which a user interacts, thereby receiving user input. As mentioned above, this user input can identify a type and/or quantity of a material to be dispensed by device 200. To facilitate this acquisition of user input, user interface 208 can comprise any device and/or system now known or later created in the art that is configured to receive tactile, visual, audible, and/or other user input. Examples include buttons, keypads, keyboards, touchscreens, joysticks, microphones, cameras, lasers, RFID sensors, interactive displays, and so on.

Canister 210 is the component of device 200 that stores, grinds, and dispenses the desired type and/or quantity of material ordered by the user. Although only one canister 210 is illustrated in FIG. 2, more than one canister 210 can be incorporated in one or more embodiments. For example, in one or more embodiments, device 200 can be configured to dispense multiple types of granular materials (e.g. cinnamon, cumin, ginger, sugar, pepper, and so on). In such case, device 200 can have multiple canisters 210, one for each type of granular material that can be dispensed by device 200.

In one or more embodiments, canister 210 includes a storage section (not illustrated in FIG. 2), dispensing mechanism 212, and grinder 214. In one or more embodiments, the storage section is simply a container in an upper portion of canister 210 that stores unground material to ultimately be dispensed and ground for the user. Dispensing mechanism 212 is the subcomponent of canister 210 which isolates measured amounts of the unground material stored in the storage section. Dispensing mechanism 212 also dispenses the isolated and measured amounts of unground material into grinder 214 for grinding. One of ordinary skill in the art will appreciate that a volumetric conversion factor will, in some embodiments, be incorporated to ensure that the total measured and isolated amount of unground material is properly proportioned so as to yield the desired quantity of ground material after grinding.

In some embodiments, dispensing mechanism 212 can measure and isolate the full amount of unground material before dispensing it into grinder 214. In other embodiments, dispensing mechanism 212 can measure and isolate a discrete amount of unground material, dispense the discrete amount into grinder 214, and then repeat this process until the total amount of unground material dispensed (that is, the sum of the discrete amounts) is approximately equal to the full amount of unground material needed so as to yield the desired quantity of ground material after grinding. For example, a user may make an order requiring two tablespoons of unground cinnamon, and dispensing mechanism 212 may be configured to isolate only one teaspoon of unground cinnamon at a time. In such case, dispensing mechanism 212 can measure and isolate one teaspoon of unground cinnamon from the overall amount of unground cinnamon stored in canister 210 and dispense that one teaspoon into grinder 214. Dispensing mechanism 212 could then repeat that process five additional times, with the result that six teaspoons, which equals two tablespoons, of unground cinnamon have been dispensed into grinder 214.

FIG. 3 illustrates top, front, bottom, and isometric views of a rotary-shuttle dispensing mechanism. In other words, FIG. 3 illustrates one potential embodiment of dispensing mechanism 212.

As shown, dispensing mechanism 212 comprises metering plate 302, skimming plate 308, and blocking plate 310. In one or more embodiments, metering plate 302 is configured to rotate about its vertical axis and contains at least one extruded hole that extends from the top face of metering plate 302 to its bottom face, thereby forming a pocket of known volume. In the embodiment illustrated in FIG. 3, metering plate 302 possesses two separate pockets 304 and 306. However, one of ordinary skill in the art will appreciate that more or fewer pockets of varying sizes can be incorporated without departing from the scope of the present disclosure. In such embodiments, more than one skimming plate 308 can be incorporated. The pockets 304 and 306 each have a thickness equal to the thickness of metering plate 302. So, the volumes of pockets 304 and 306 are equal to their thickness multiplied by their cross-sectional areas. In the embodiment illustrated in FIG. 3, pocket 304 has a smaller cross-sectional area than does pocket 306, and so pocket 304 likewise has a smaller known volume. The known volumes of pockets 304 and 306 can, in one or more embodiments, be set at conventional serving sizes. For example, pocket 304 can be proportioned so as to ensure that its volume is approximately equal to a teaspoon. Likewise, pocket 306 can be proportioned so as to ensure that its volume is approximately equal to a tablespoon. One of ordinary skill in the art will appreciate that other sizes of pockets can be incorporated. The volumetric conversion factors may be incorporated herein. For example, pocket 304 can be proportioned so that it can be filled with a volume of unground material, which volume of unground material yields a teaspoon of ground material after grinding. Similarly, pocket 306 can be proportioned so that it can be filled with a volume of unground material, which volume of unground material yields a tablespoon of ground material after grinding. Such conversion factors may vary with the type of material being dispensed.

As shown, skimming plate 308 can be positioned above metering plate 302. Skimming plate 308 may be of any appropriate shape or size that does not completely cover the top face of metering plate 302. Since metering plate 302 can rotate, pockets 304 and 306 may sometimes be underneath skimming plate 308 and may, at other times, not be underneath skimming plate 308. When pockets 304 and 306 are not underneath skimming plate 308, they are exposed to storage section 314, which is a designated space above dispensing mechanism 212 to be filled with an inventory of unground material to be dispensed. Thus, when pockets 304 and 306 are exposed to storage section 314, gravity will cause pockets 304 and 306 to be filled with unground material. In one or more embodiments, metering plate 302 can then rotate clockwise such that pocket 306 slides underneath skimming plate 308, thereby skimming excess unground material from pocket 306. Once pocket 306 is fully underneath skimming plate 308, a volume of unground material approximately equal to the known volume of pocket 306 will have been isolated within pocket 306 and separated from the inventory of unground material in storage section 314. One of ordinary skill in the art will appreciate that metering plate 302 can be configured to rotate counterclockwise so as to reach an analogous result with pocket 304.

As shown, blocking plate 310 can be positioned beneath metering plate 302. In one or more embodiments, blocking plate 310 has an extruded hole 312 that is positioned vertically beneath skimming plate 308. So, as metering plate 302 rotates clockwise, pocket 306 will slide under skimming plate 308, such that it is no longer exposed to the inventory of unground material in storage section 314. However, in doing so, pocket 306 will then rotate into alignment with hole 312, such that the known volume of unground material isolated within pocket 306 falls through hole 312 and into grinder 214 (not illustrated in FIG. 3) without having additional unground material enter pocket 306 from above. Again, an analogous result is achieved with pocket 304 by rotating metering plate 302 counterclockwise.

FIG. 4 illustrates top, front, bottom, and isometric views of an alternate rotary-shuttle dispensing mechanism. In other words, FIG. 4 depicts an alternate embodiment of dispensing mechanism 212.

As shown, dispensing mechanism 212 can comprise pocket 402, top metering plate 404, and bottom metering plate 408. Pocket 402 is a structure having a top end and a bottom end. An extruded hole runs from the top end of pocket 402 to its bottom end, thereby forming a hollow space of known volume inside pocket 402. Both ends of pocket 402 are open. Top metering plate 404 can rotate about its vertical axis and includes a hole 406. Likewise, bottom metering plate 408 can rotate about its vertical axis and has a hole 410. In one or more embodiments, rotation of top metering plate 404 and bottom metering plate 408 can be driven by driving shaft 414. In fact, rotation of metering plate 302 in FIG. 3 can be driven by an analogous driving shaft (even though this is not depicted in FIG. 3).

Similarly to what FIG. 3 shows, hole 406 of top metering plate 404 is exposed to an inventory of unground material stored in storage section 314. When hole 406 and the top end of pocket 402 are not in vertical alignment, no amount of unground material from storage section 314 can enter pocket 402. As top metering plate 404 rotates, hole 406 can come into alignment with pocket 402, at which point gravity forces unground material from storage section 314 to pass through hole 406 and the top end of pocket 402, thereby filling pocket 402. As top metering plate 404 continues to rotate, hole 406 can then move out of alignment with pocket 402, thereby isolating within pocket 402 an amount of unground material having a volume approximately equal to the known volume of pocket 402. Hole 410 of bottom metering plate 408 is not in alignment with the bottom end of pocket 402 while hole 406 of top metering plate 404 is aligned with pocket 402. This ensures that all unground material that travels from storage section 314, through pocket 402, and into grinder 214 (not depicted in FIG. 4) is properly measured. After hole 406 is no longer in alignment with pocket 402, bottom metering plate 408 can rotate so that hole 410 is aligned with the bottom end of pocket 402, at which point gravity will force the isolated amount of unground material (having known volume) within pocket 402 to fall through hole 410 and into grinder 214 (not depicted in FIG. 4). Because hole 406 of top metering plate 404 is not aligned with pocket 402 when hole 410 of bottom metering plate 408 is aligned with pocket 402, only the isolated amount of unground material within pocket 402 will fall through hole 410 and into the grinder. Just as explained above, those of ordinary skill in the art will appreciate that the volume of pocket 402 can be sized appropriately with the incorporation of volumetric conversion factors.

In one or more embodiments, the outer structure of pocket 402 can include a protrusion 412. Protrusion 412 simply ensures that no unground material from storage section 314 passes through hole 406 of top metering plate 404 when hole 406 is not aligned with pocket 402.

Moreover, those of ordinary skill in the art will appreciate that dispensing mechanism 212 can be practiced using more than one pocket 402, more than one hole 406 in top metering plate 404, and more than one hole 410 in bottom metering plate 408.

Further still, although FIG. 3 and FIG. 4 depict two particular embodiments of dispensing mechanism 212, those of ordinary skill in the art will appreciate that the present invention can be practiced with any other dispensing mechanism now known or later created in the art that is configured to dispense measured amounts of unground material from an inventory of unground material into grinder 214. Examples include augers, rollers, pneumatic dispensers, and so on.

FIG. 5 illustrates top and side views of a conical burr grinder and a blade. In other words, FIG. 5 illustrates potential embodiments of grinder 214.

In one or more embodiments, grinder 214 comprises outer burr 502 and inner burr 504. As shown, inner burr 504 has a frustoconical shape that tapers outward from top to bottom while outer burr 502 is uniformly shaped. However, those of ordinary skill will appreciate that inner burr 504 can be uniformly shaped (e.g. cylindrical) while outer burr 502 tapers outward from top to bottom. In any case, a gap is created between inner burr 504 and outer burr 502, which gap is widest near the tops of the burrs and thinnest near the bottoms. In one or more embodiments, inner burr 504 can rapidly rotate so as to grind unground material. Measured amounts of unground material fall into grinder 214 from dispensing mechanism 212 above (not depicted in FIG. 5), and the measured amounts of unground material are ground by being broken apart between the ridges of inner burr 504 and the ridges of outer burr 502. Outer burr 502 can be made to rotate while inner burr 504 remains stationary without departing from the scope of the present disclosure. Additionally, both burrs can be made to rotate.

In one or more embodiments, grinder 214 can comprise blades 506 extending from a central shaft configured to rotate at high speed. After measured amounts of unground material fall into grinder 214 from dispensing mechanism 212 above, blades 506 can rotate to commence grinding. Any number of blades 506 can be incorporated.

Any other method and/or device now known or later created in the art that can grind material can be incorporated without departing from the scope of the present disclosure.

Figure 6:
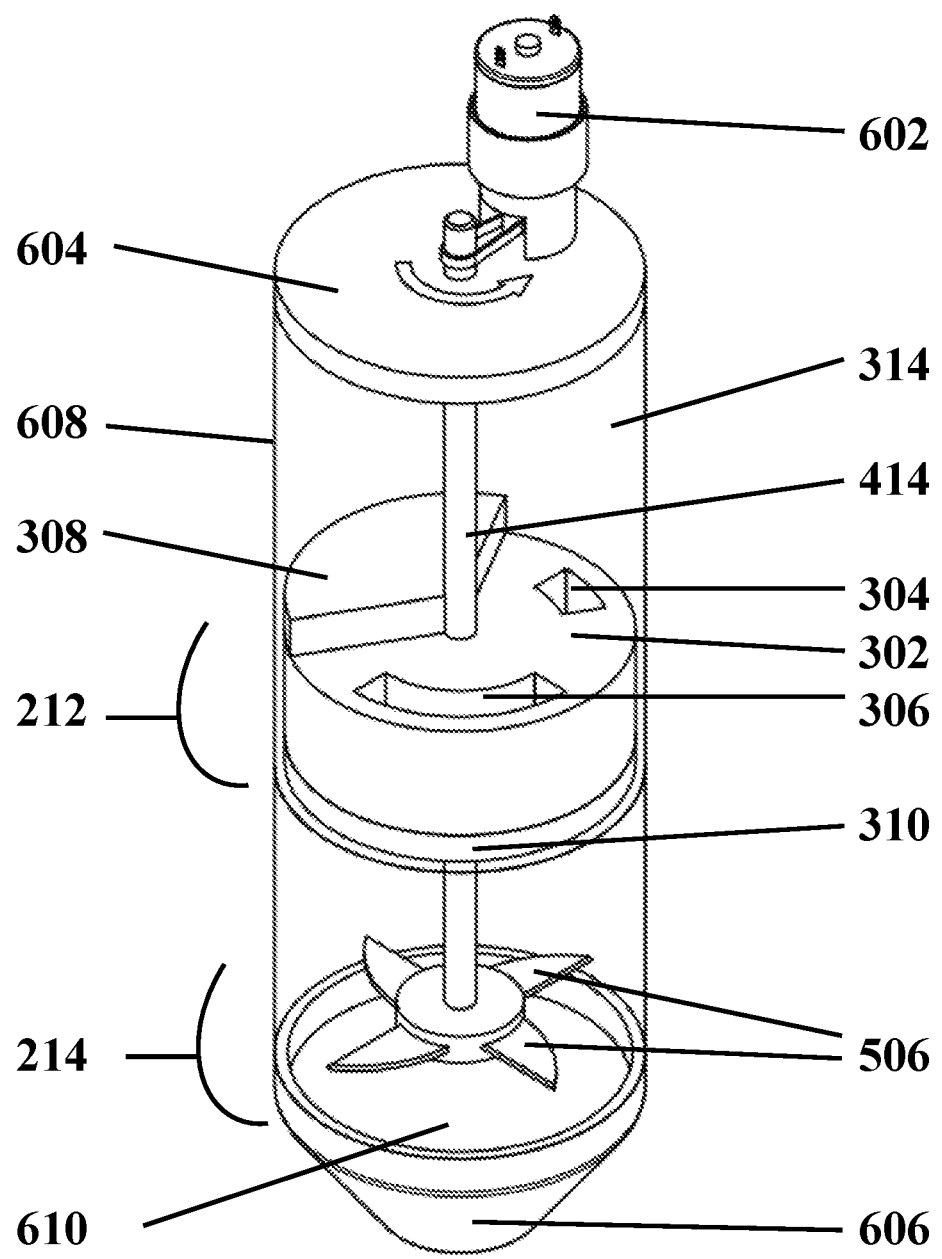
FIG. 6 illustrates a perspective view of an assembled canister comprising a dispensing mechanism and a grinder.

FIG. 6 illustrates a perspective view of an assembled canister comprising a dispensing mechanism and a grinder. In other words, FIG. 6 depicts one embodiment of an entire, assembled canister 210.

As shown, canister 210 can include storage section 314, the version of dispensing mechanism 212 that is illustrated in FIG. 3, and the blade-version of grinder 214. As explained above, dispensing mechanism 212 can comprise metering plate 302 which is configured to rotate and which has pockets 304 and 306, skimming plate 308 above metering plate 302, and blocking plate 310 below metering plate 302 and having hole 312 (not illustrated in FIG. 6). Below dispensing mechanism 212 is grinder 214. As shown, grinder 214 can include blades 506. In one or more embodiments, grinder 214 can have outer burr 502 and inner burr 504 (not depicted in FIG. 6). As shown, storage section 314 can be a containment area above dispensing mechanism 212 that is defined by canister wall 608. Storage section 314 can be manually filled with an inventory of unground material to be dispensed by removing canister lid 604 and pouring unground material into storage section 314 through the top of canister 210. In one or more embodiments, canister lid 604 can comprise any device and/or method now known or later created in the art that is configured to be removable. As some examples, canister lid 604 can be a threaded lid configured to be screwed on and off of the top of canister 210; a hinged lid that can swing open about a hinge and be fastened by a latch; a snap-on cap that can be pressed onto and pulled off of the top of canister 210; and so on. In one or more embodiments, canister 210 can include funnel 606 to ensure that any ground material exiting grinder 214 falls into a receptacle placed beneath canister 210. In some embodiments, canister 210 can comprise canister floor 610, which prevents material from exiting grinder 214 and entering the receptacle until the grinding process is complete. Canister floor 610 can comprise any device and/or method now known or later created in the art that is configured to contain material within grinder 214 until after grinding. As some examples, canister floor 610 can be a hinged hatch that can swing open once grinding is complete; a slidable hatch that can slide open once grinding is complete; and so on. In one or more embodiments, canister 210 does not include canister floor 610, meaning that canister 210 has an open bottom. Such embodiments may work well with the burr-version of Grinder 214.

In one or more embodiments, grinder 214 and metering plate 302 can rotate with each being driven by separate electric motors. This could allow for independent rotation of grinder 214 and metering plate 302. In other embodiments, grinder 214 and metering plate 302 can be independently driven by the same electric motor 602 via driving shaft 414.

Figure 7:
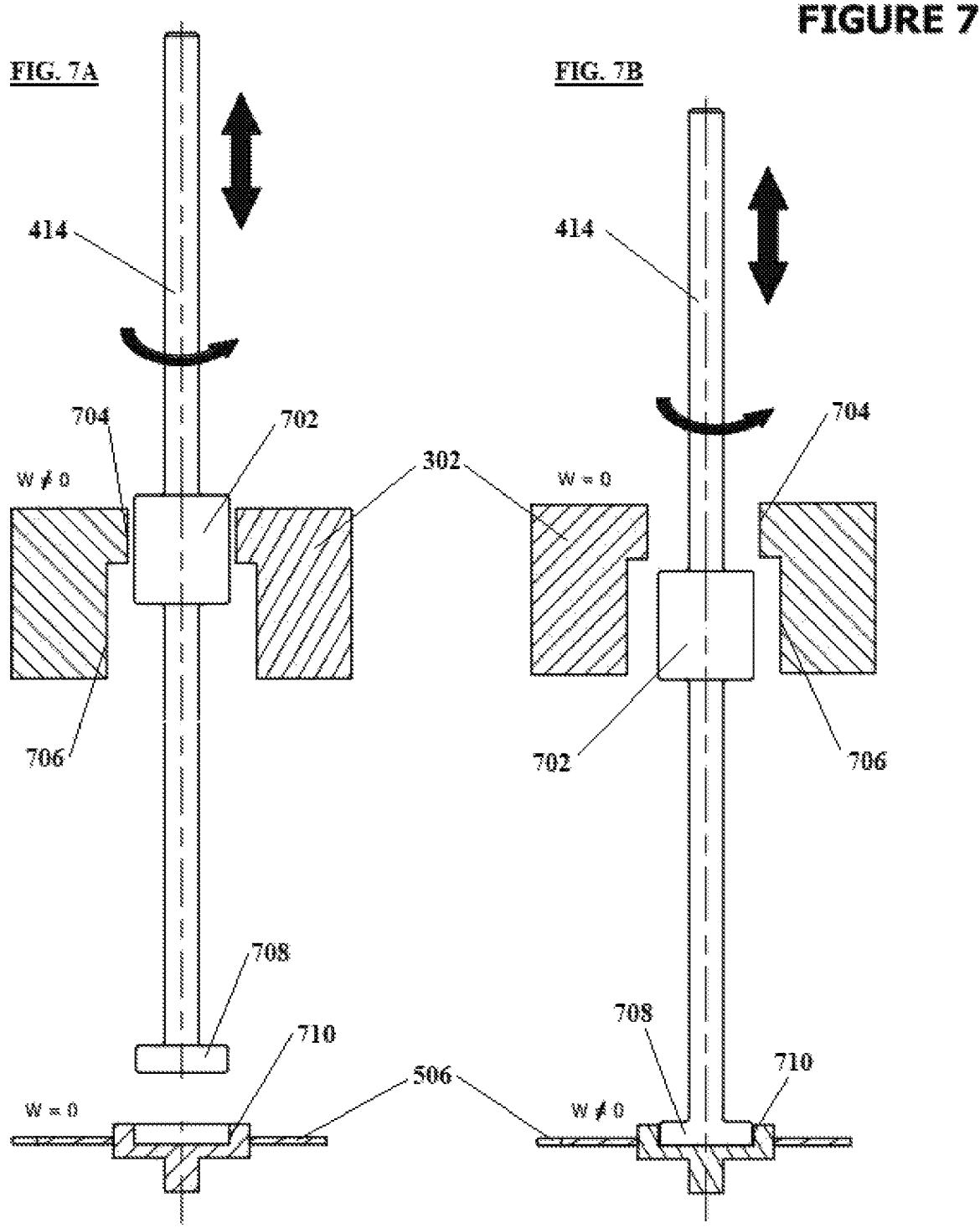
FIGS. 7A and 7B illustrate profile views of a gear shift mechanism of an assembled canister.

FIG. 7 illustrates profile views (FIGS. 7A and 7B) of a gear shift mechanism of an assembled canister. In other words, FIG. 7 depicts one embodiment of a gear shift mechanism that allows a single electric motor 602 to independently rotate metering plate 302 and grinder 214.

As indicated by the arrows in FIG. 7, driving shaft 414 can be rotated clockwise and/or counterclockwise by electric motor 602 (not depicted in FIG. 7) and can be moved vertically up and/or down by a linear actuator (not depicted in FIG. 7). In one or more embodiments, driving shaft 414 comprises gear 702 and gear 708. As shown, metering plate 302 can include gear slot 704 that is configured to mesh with gear 702, and grinder 214 can include gear slot 710 that is configured to mesh with gear 708. FIG. 7A depicts driving shaft 414 when it is in mesh with metering plate 302 and not in mesh with grinder 214. In this position, gear 702 is in mesh with gear slot 704, but gear 708 is not in mesh with gear slot 710. Thus, when driving shaft 414 rotates, metering plate 302 will rotate, but grinder 214 will not rotate. Conversely, FIG. 7B depicts driving shaft 414 after a linear actuator (not depicted in FIG. 7) moves driving shaft 414 vertically downward so that driving shaft 414 is in mesh with grinder 214 and not in mesh with metering plate 302.

In this position, gear 702 is not in mesh with gear slot 704 and is also not in contact with wall 706 of metering plate 302. But, gear 708 is in mesh with gear slot 710. Thus, when driving shaft 414 rotates, metering plate 302 will not rotate, but grinder 214 will rotate. Those of ordinary skill in the art will appreciate that any method and/or device now known or later created in the art that can allow driving shaft 414 to slidably move up and/or down so as to slide into and out of mesh with metering plate 302 and grinder 214 can be incorporated without departing from the scope of the present disclosure.

Although FIG. 7 depicts the blade-embodiment of grinder 214 (having blades 506), the illustrated gear shift mechanism is equally applicable to the burr-embodiment of grinder 214 or any other grinder now known or later created in the art.

Figure 8:
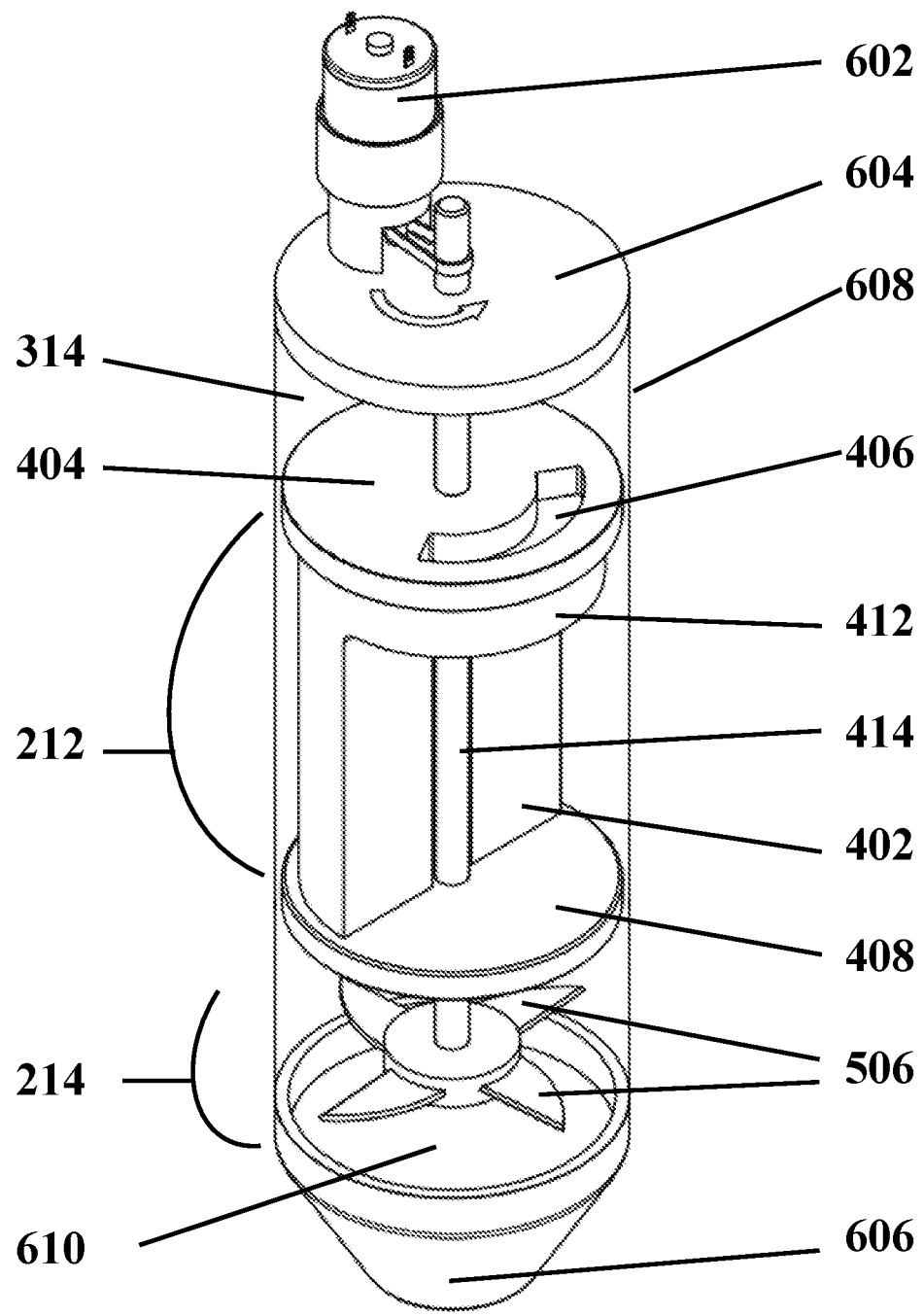
FIG. 8 illustrates a perspective view of an assembled canister comprising an alternate dispensing mechanism and a grinder.

FIG. 8 illustrates a perspective view of an assembled canister comprising an alternate dispensing mechanism and a grinder. In other words, FIG. 8 depicts an entire, assembled canister comprising the version of dispensing mechanism 212 that is illustrated in FIG. 4.

Those of ordinary skill in the art will appreciate that much of the discussion of FIG. 6 is equally applicable to FIG. 8. As shown, canister 210 can comprise an alternate embodiment of dispensing mechanism 212 and grinder 214. Dispensing mechanism 212 can have pocket 402 of known volume, top metering plate 404 that can rotate and having hole 406, and bottom metering plate 408 that can rotate and having hole 410 (not illustrated in FIG. 8). Hole 406 is exposed from above to storage section 314, which stores an inventory of unground material to be dispensed. Once top metering plate 404 rotates so that hole 406 is aligned with pocket 402, gravity will cause pocket 402 to fill with unground material. Once top metering plate 404 rotates so that hole 406 is no longer in alignment with pocket 402, a measured amount of unground material will have been isolated within pocket 402, which isolated amount has a volume approximately equal to the known volume of pocket 402. Bottom metering plate 408 can then rotate so that hole 410 is aligned with pocket 402, thereby allowing the isolated amount of unground material to exit pocket 402 and to enter grinder 214. Grinder 214 can then be actuated to grind the material. Just as in FIG. 6, canister lid 604 can be configured to be removable so as to allow storage section 314 to be manually filled with an inventory of unground material. Additionally, canister floor 610, as described above, can optionally be incorporated, as can funnel 606. Moreover, those of ordinary skill will appreciate that any embodiment of grinder 214 can be incorporated without departing from the scope of the present disclosure.

In one or more embodiments, top metering plate 404, bottom metering plate 408, and grinder 214 can each be driven by separate electric motors. In other embodiments, just as in FIG. 6, top metering plate 404, bottom metering plate 408, and grinder 214 can be independently driven by a single electric motor 602 via driving shaft 414.

FIG. 9 illustrates profile views of a gear shift mechanism of an assembled canister. In other words, FIG. 9 depicts one embodiment of a gear shift mechanism that allows a single electric motor 602 to independently rotate top metering plate 404, bottom metering plate 408, and grinder 214.

As indicated by the arrows in FIG. 9, driving shaft 414 can be rotated clockwise and/or counterclockwise by electric motor 602 (not depicted in FIG. 9) and can be moved vertically up and/or down by a linear actuator (not depicted in FIG. 9). In one or more embodiments, driving shaft 414 can have gear 902, gear 908, and gear 914. As shown, top metering plate 404 can include gear slot 904 that is configured to mesh with gear 902, bottom metering plate 408 can include gear slot 910 that is configured to mesh with gear 908, and grinder 214 can comprise gear slot 916 that is configured to mesh with gear 914. FIG. 9A depicts driving shaft 414 when it is in mesh with top metering plate 404 and not in mesh with bottom metering plate 408 or grinder 214. In this position, gear 902 is in mesh with gear slot 904, but gear 908 is not in mesh with gear slot 910 and gear 914 is not in mesh with gear slot 916. Thus, when driving shaft 414 rotates, top metering plate 404 will rotate, but bottom metering plate 408 and grinder 214 will not rotate. Now, FIG. 9B depicts driving shaft 414 after a linear actuator (not depicted in FIG. 9) moves driving shaft 414 vertically downward so that driving shaft 414 is in mesh with bottom metering plate 408 and not in mesh with top metering plate 404 or grinder 214. In this position, gear 902 is not in mesh with gear slot 904 and is also not in contact with wall 906 of top metering plate 404. Similarly, gear 914 is still not in mesh with gear slot 916. But, gear 908 is in mesh with gear slot 910. Thus, when driving shaft 414 rotates, top metering plate 404 and grinder 214 will not rotate, but bottom metering plate 408 will rotate. Finally, FIG. 9C depicts driving shaft 414 after a linear actuator (not depicted in FIG. 9) further moves driving shaft 414 vertically downward so that driving shaft 414 is in mesh with grinder 214 and not in mesh with top metering plate 404 or bottom metering plate 408. In this position, gear 902 is not in mesh with gear slot 904 and is also not in contact with wall 906 of top metering plate 404. Similarly, gear 908 is not in mesh with gear slot 910 and is also not in contact with wall 912 of bottom metering plate 408. But, gear 914 is in mesh with gear slot 916. Thus, when driving shaft 414 rotates, top metering plate 404 and bottom metering plate 408 will not rotate, but grinder 214 will rotate. Those of ordinary skill in the art will appreciate that any method and/or device now known or later created in the art that can allow driving shaft 414 to slidably move up and/or down so as to slide into and out of mesh with top metering plate 404, bottom metering plate 408, and grinder 214 can be incorporated without departing from the scope of the present disclosure.

Just as in FIG. 7, those of ordinary skill will understand that the gear shift mechanism illustrated in FIG. 9 is equally applicable to any other embodiment of Grinder 214.

Moreover, those of ordinary skill will further appreciate that FIG. 7 and FIG. 9 depict two potential ways of enabling a single motor 602 to control both Dispensing Mechanism 212 and Grinder 214, and they will likewise appreciate that other methods and/or devices now known or later created in the art can be used to do so.

FIG. 10 illustrates a schematic block diagram of an automated dispenser and grinder, comprising a packaging system.

As shown, Automated Granular Material Dispensing System 1000 (hereafter referred to as "device 1000") can, in one or more embodiments, comprise the same components as device 200, in addition to comprising packaging system 1002. Packaging system 1002 corresponds to the packaging system discussed above in conjunction with FIG. 1. As explained, packaging system 1002 is the component of device 1000 that physically manipulates a receptacle while the receptacle is within device 1000. In one or more embodiments, packaging system 1002 can grasp/hold a receptacle. In some embodiments, the receptacle can be retrieved by packaging system 1002 from a receptacle storage (as described below), or the receptacle can be placed in packaging system 1002 manually by the user. Once a receptacle has been obtained, packaging system 1002 can, in one or more embodiments, physically move the receptacle to a location beneath the desired canister 210 so that the receptacle can receive the type and quantity of material ordered by the user after grinding by grinder 214. Packaging system 1002 can then physically move the filled receptacle to a location beneath another canister 210 to receive another granular material (for example, if the user ordered a blend of spices), to a capping station so that the receptacle can receive a covering to prevent spillage after the user obtains the receptacle (as discussed below), or directly to a drop-off station so that the receptacle can be obtained by the user. As mentioned above, packaging system 1002 eliminates the need for a user to manually manipulate a receptacle during the dispensation process, thereby significantly decreasing the probability of spillage and waste.

Those of ordinary skill in the art will appreciate that packaging system 1002 can be operated and/or controlled by control system 206.

FIG. 11 illustrates top views (FIGS. 11A and 11B) of a packaging system. In other words, FIG. 11 depicts a particular embodiment of packaging system 1002.

As shown, packaging system 1002 can include rail 1102, extendable member 1104, and end-effector 1106. End-effector 1106 is the subcomponent which physically interacts with the receptacle. That is, end-effector 1106 serves as the "hand" of packaging system 1002. In one or more embodiments, end-effector 1106 can comprise a robotic manipulator and/or claw that can open and/or close, so as to grab onto and let go of a receptacle. In other embodiments, end-effector 1106 can comprise any method and/or device now known or later created in the art that physically manipulates and/or interacts with a receptacle so as to position the receptacle beneath canister 210 to receive ground material, beneath a capping station to receive a covering, and/or at a drop-off station to be obtained by the user.

As shown, end-effector 1106 is attached to an end of extendable member 1104. Extendable member 1104 serves as the "arm" of packaging system 1002 and can extend and retract along its longitudinal axis. This longitudinal extension and retraction is apparent by comparing FIG. 11A (extended position) to FIG. 11B (retracted position). Moreover, this longitudinal extension and retraction of extendable member 1104 allows end-effector 1106 to traverse one linear dimension (labeled X-Dimension in FIG. 11) within device 1000. In one or more embodiments, extendable member 1104 can include telescoping members 1112, 1114, and 1116, wherein member 1116 can slide into and out of member 1114, which itself can slide into and out of member 1112, and so on. This telescoping action is apparent by comparing FIG. 11A (where members 1112, 1114, and 1116 are fully extended) to FIG. 11B (where member 1116 is inside member 1114, which is inside member 1112). Those of ordinary skill in the art will appreciate that any number and configuration of telescoping members can be incorporated without departing from the scope of the present disclosure. Telescoping members 1112, 1114, and 1116 can be driven by one or more linear actuators (not depicted in FIG. 11), or any other actuators now known or later created in the art. In other embodiments, extendable member 1104 can comprise any method and/or device now known or later created in the art that can extend and retract along its longitudinal axis so as to enable end-effector 1106 to traverse a linear dimension within device 1000.

As shown, extendable member 1104 is slidably attached to rail 1102, allowing extendable member 1104 to slide along a longitudinal axis of rail 1102. Because extendable member 1104 can slide longitudinally along the length of rail 1102, extendable member 1104 (and thus end-effector 1106) can traverse a linear dimension (labeled Y-Dimension in FIG. 11) within device 1000. In one or more embodiments, rail 1102 and extendable member 1104 are positioned orthogonally or substantially-orthogonally to each other. This orthogonal or substantially-orthogonal arrangement creates a linearly independent set of two dimensions (X-Dimension and Y-Dimension) along which end-effector 1106 can travel. Thus, end-effector 1106 can traverse the entire plane containing the longitudinal axes of rail 1102 and extendable member 1104. Although FIG. 11 depicts rail 1102 and extendable member 1104 as linear or substantially-linear and orthogonal to each other, those of ordinary skill in the art will appreciate that one and/or both of rail 1102 and extendable member 1104 can be non-linear and/or curved, and they will likewise appreciate that rail 1102 and extendable member 1104 can be positioned in an arrangement other than substantially-orthogonal to one another. Now, in one or more embodiments, extendable member 1104 can be slidably attached to rail 1102 by sliding-sheath 1108. Sliding-sheath 1108 can simply comprise a shell with the same cross-sectional shape as rail 1102 (which can be circular or any other shape), but that is larger so as to be able to fit over rail 1102 and to slide longitudinally along the length of rail 1102. Extendable member 1104 is then attached to sliding-sheath 1108, thereby enabling extendable member 1104 to slide along the length of rail 1102. In one or more embodiments, electric motor 1110 can drive extendable member 1104 along the length of rail 1102. Those of ordinary skill in the art will understand that any other method and/or device now known or later created in the art that can allow extendable member 1104 to be slidably attached to rail 1102 can be incorporated without departing from the scope of the present disclosure.

Figure 12:
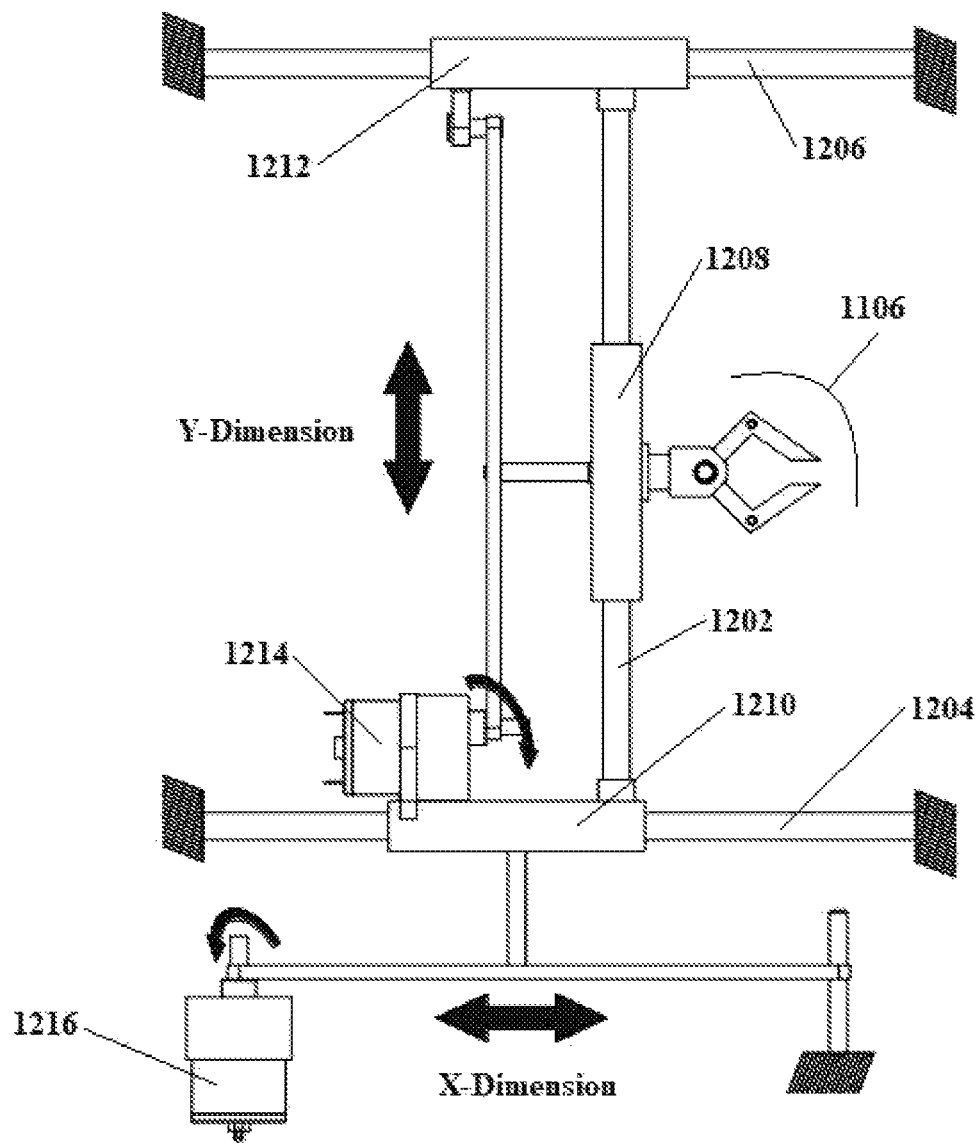
FIG. 12 illustrates a top view of an alternate packaging system.

FIG. 12 illustrates a top view of an alternate packaging system. In other words, FIG. 12 depicts an additional embodiment of packaging system 1002.

As shown, packaging system 1002 can include end-effector 1106, rail 1202, and rails 1204 and 1206. In one or more embodiments, end-effector 1106 can be just as described above in conjunction with FIG. 11. That is, end-effector 1106 is the component that physically interacts with and grasps a receptacle. As such, end-effector 1106 can incorporated any method and/or device now known or later created in the art that can physically manipulate a receptacle.

Now, end-effector 1106 can be slidably attached to rail 1202 via sliding sheath 1208 (or any other method and/or device now known or later created in the art), allowing end-effector 1106 to slide along a longitudinal axis of rail 1202. Thus, end-effector 1106 can traverse a linear dimension (labeled Y-Dimension in FIG. 12) within device 1000. As shown, end-effector 1106 can be driven along the longitudinal axis of rail 1202 via motor 1214.

In one or more embodiments, the ends of rail 1202 can themselves be slidably attached to rails 1204 and 1206 via sliding sheaths 1210 and 1212, respectively, thereby allowing rail 1202 to slide along longitudinal axes of rails 1204 and 1206. Thus, rail 1202 (and therefore end-effector 1106) can traverse a linear dimension (labeled X-Dimension in FIG. 12) within device 1000. As shown, rail 1202 can be driven along the longitudinal axes of rails 1204 and 1206 via motor 1216. In one or more embodiments, rail 1202 can be oriented orthogonal to or substantially-orthogonal to rails 1204 and 1206. This orthogonal or substantially-orthogonal arrangement creates a linearly independent set of two dimensions (X-Dimension and Y-Dimension) along which end-effector 1106 can travel. Thus, end-effector 1106 can traverse the entire plane containing the longitudinal axes of rails 1202, 1204, and 1206. Although FIG. 12 depicts rails 1202, 1204 and 1206 as linear or substantially-linear, those of ordinary skill in the art will appreciate that any of rails 1202, 1204, and 1206 can be non-linear and/or curved. Moreover, although FIG. 12 depicts rail 1202 as orthogonal or substantially-orthogonal to rails 1204 and 1206, those of ordinary skill in the art will likewise appreciate that rail 1202 and rails 1204 and 1206 can be positioned in an arrangement other than orthogonal or substantially-orthogonal to one another. Further still, even though FIG. 12 depicts an embodiment having both rails 1204 and 1206, those of ordinary skill in the art will appreciate that incorporating just one of rail 1204 and rail 1206 is sufficient for rail 1202 to traverse the X-Dimension within device 1000.

FIG. 13 illustrates top views (FIGS. 13A and 13B) of an end-effector. In other words, FIG. 13 depicts one embodiment of end-effector 1106.

As explained above, end-effector 1106 is the component which physically interacts with the receptacle, thereby serving as the "hand" of packaging system 1002. In one or more embodiments, end-effector 1106 can comprise a robotic manipulator and/or claw that can open and/or close, so as to grab onto and let go of a receptacle. One such embodiment is depicted in FIG. 13. As shown, end-effector 1106 can potentially comprise housing 1302, joint 1304, and fingers 1306. Fingers 1306 can open (FIG. 13A) and/or close (FIG. 13B) in order to grab onto and let go of a receptacle. In one or more embodiments, fingers 1306 can be driven by one or more electric motors, such as DC motors, servo motors, stepper motors, and so on (not depicted in FIG. 13). These motors can cause fingers 1306 to pivot about joint 1304. Moreover, these motors and any associated gears can be housed in and/or mounted on housing 1302.

FIG. 13 illustrates merely one example of a potential embodiment of end-effector 1106. Those of ordinary skill in the art will appreciate that end-effector 1106, in other embodiments, can comprise additional and/or different joints, housings, and/or fingers, and may even comprise any method and/or device now known or later created in the art that can physically manipulate and/or interact with a receptacle so as to position the receptacle beneath canister 210 to receive ground material, beneath a capping station to receive a covering, and/or at a drop-off station to be obtained by the user.

FIG. 14 illustrates side views (FIGS. 14A and 14B) of an end-effector configured for vertical motion. In other words, FIG. 14 depicts one embodiment in which end-effector 1106 can traverse a substantially-vertical direction in addition to the planes described in conjunction with FIG. 11 and FIG. 12.

As shown, housing 1302 can, in one or more embodiments, be attached to an end of extendable member 1402, with the other end of extendable member 1402 being attached to element 1404. Extendable member 1402 can extend and/or retract along its longitudinal axis, much like extendable member 1104. Thus, much of the discussion of extendable member 1104 in conjunction with FIG. 11 applies here with respect to extendable member 1402. Just as above, extendable member 1402 can comprise telescoping sub-members, or any other method and/or device now known or later created in the art that can allow extendable member 1402 to extend and/or retract along its longitudinal axis. Since end-effector 1106 is attached to extendable member 1402, end-effector 1106 can traverse a linear dimension (labeled Vertical Dimension) within device 1000. If this embodiment were incorporated into the packaging system 1002 of FIG. 11, the Vertical Dimension would be normal to or substantially-normal to the plane containing rail 1102 and extendable member 1104. Moreover, element 1404 would attach to one end of extendable member 1104 (not depicted in FIG. 14). Similarly, if this embodiment were incorporated into the packaging system 1002 of FIG. 12, the Vertical Dimension would be normal to or substantially-normal to the plane containing rails 1202, 1204, and 1206. Moreover, element 1404 would attach to sliding sheath 1208 (not depicted in FIG. 14). Those of ordinary skill in the art will appreciate that extendable member 1402 can be driven by one or more linear actuators, or any other method and/or device now known or later created in the art that can enable extendable member 1402 to extend and/or retract along its longitudinal axis.

FIG. 15 illustrates a schematic block diagram of an automated dispenser and grinder, comprising a receptacle storage.

As shown, Automated Granular Material Dispensing System 1500 (hereafter referred to as "device 1500") can comprise all the components of device 1000, in addition to receptacle storage 1502. Receptacle storage 1502 can house one or more receptacles within device 1500 such that the receptacles can be retrieved by packaging system 1002. For example, after a user places an order for a type and/or quantity of material to be dispensed, the user could manually place a receptacle under the appropriate canister 210 in device 200, or the user could manually place a receptacle within the grasp of packaging system 1002 in device 1000. However, in device 1500, the user would not have to manually manipulate a receptacle at all before it has been filled with material. Rather, packaging system 1002 could simply retrieve a receptacle from receptacle storage 1502 and then place that receptacle beneath the appropriate canister 210 to receive dispensed material. In one or more embodiments, receptacle storage 1502 can comprise a housing member that stores one or more stacks of receptacles, from which packaging system 1002 can retrieve the top-most and/or bottom-most receptacle of a stack. In other embodiments, receptacle storage 1502 can comprise any method and/or device now known or later created in the art that can store receptacles such that the receptacles are retrievable by packaging system 1002. Since a receptacle could be automatically retrieved from receptacle storage 1502 by packaging system 1002, there is no need for the user to manually manipulate the receptacle prior to and/or during dispensation, thus ensuring that no material dispensed from canister 210 misses the receptacle. This further improves over the prior art by reducing spillage and waste.

FIG. 16 illustrates side views (FIGS. 16A and 16B) of an end-effector interacting with a receptacle storage.

As shown in FIG. 16A, end-effector 1106 can extend in a substantially-vertical direction via extendable member 1402 such that a bottom-most receptacle is within grasping distance of fingers 1306. As shown in FIG. 16B, fingers 1306 can then close, such that they are grasping the bottom-most receptacle, and end-effector 1106 can then retract in a substantially-vertical direction to be at an appropriate height so as to position the receptacle beneath a canister 210. As shown, receptacle storage 1502 can, in one or more embodiments, comprise housing member 1602 to house one or more stacks of receptacles. In some embodiments, receptacle storage 1502 can comprise spring-loaded member 1604 within housing member 1602 that applies a force to the stack of receptacles along a longitudinal axis of housing member 1602. Spring-loaded member 1604, in these embodiments, thus helps to ensure that the one or more stacks of receptacles do not jam inside housing member 1602 and to ensure that the bottom-most receptacle is always protruding beneath housing member 1602 so as to be graspable by end-effector 1106. Those of ordinary skill in the art will appreciate that FIG. 16 depicts merely one potential embodiment of receptacle storage 1502. Moreover, those of ordinary skill will understand that the present disclosure encompasses any other method and/or device now known or later created in the art that can store one or more stacks of receptacles so that packaging system 1002 can retrieve a receptacle.

FIG. 17 illustrates a schematic block diagram of an automated dispenser and grinder, comprising a capping station.

As shown, Automated Granular Material Dispensing System 1700 (hereafter referred to as "device 1700") can comprise all the components of device 1500, in addition to capping station 1702. Capping station 1702 corresponds to the capping station discussed above in conjunction with FIG. 1. In one or more embodiments, capping station 1702 can apply a covering (e.g. a cap, a lid, a top, and so on) to a filled receptacle, thereby resulting in a filled and packaged/covered receptacle ready to be obtained by the user. In one or more embodiments, capping station 1702 can press-fit a plastic lid onto a filled receptacle. In other embodiments, capping station 1702 can apply a paper, wax paper, and/or plastic wrap covering onto a filled receptacle. In still other embodiments, capping station 1702 can comprise any method and/or device now known or later created in the art that can apply a covering onto a filled receptacle. Since capping station 1702 automatically applies a covering onto a filled receptacle, the user does not have to manually apply a covering, thereby further reducing the risk of spillage and waste.

Those of ordinary skill in the art will appreciate that capping station 1702 can be operated and/or controlled by control system 206.

FIG. 18 illustrates side views (FIGS. 18A and 18B) of a capping station.

As shown, capping station 1702 can, in one or more embodiments, comprise stacking member 1802 and cap-applicator 1806. Stacking member 1802 simply houses one or more stacks of coverings (e.g. plastic lids, as depicted in FIG. 18). Stacking member 1802 can be vertically or substantially-vertically oriented. However, those of ordinary skill in the art will understand that other orientations are possible. Just as with receptacle storage 1502, capping station 1702 can, in one or more embodiments, include spring-member 1804 to apply a force to the stack(s) of coverings within stacking member 1802 and along a longitudinal axis of stacking member 1802. This helps to ensure that the coverings do not get jammed inside the stacking member 1802 and that a bottom-most (or, in one or more embodiments, a top-most) covering is protruding sufficiently far beneath (or above) the stacking member 1802 to be graspable by the cap-applicator 1806.

As shown, cap-applicator 1806 can comprise extendable member 1808 and capping-end-effector 1810. Extendable member 1808 can be like extendable members 1104 and 1402, discussed above. Thus, extendable member 1808 can extend and/or retract along its longitudinal axis. It can do this by comprising telescoping members or any other method and/or device now known or later created in the art that can extend and/or retract along a longitudinal axis. Moreover, extendable member 1808 can be driven by one or more linear actuators, or any other actuators known in the art. Capping-end-effector 1810 can, in one or more embodiments, comprise any robotic manipulator and/or claw that can obtain/grasp a covering from stacking member 1802. In some embodiments, capping-end-effector 1810 can have the same structure as end-effector 1106. In other embodiments, capping-end-effector 1810 can have a specialized structure so as to be able to accommodate and appropriately grasp the coverings stored in stacking member 1802. As shown in FIG. 18, cap-applicator 1806 can move from one position (FIG. 18A), in which capping-end-effector 1810 is able to grasp a bottom-most covering from the stack of coverings, to a second position (FIG. 18B), in which cap-applicator 1806 presses the obtained covering onto a filled receptacle waiting beneath capping station 1702. Those of ordinary skill in the art will appreciate that any other methods and/or devices now known or later created in the art that can apply a covering onto a filled receptacle can be incorporated without departing from the scope of the present disclosure.

FIG. 19 illustrates a perspective view (FIG. 19C) of a capping station and top views (FIGS. 19A and 19B) of a capping-end-effector.

FIGS. 19A and 19B depict two potential embodiments of capping-end-effector 1810. First, as shown in FIG. 19A, capping-end-effector 1810 can comprise element 1904 and fingers 1902. Element 1904 can have a torus-shaped structure such that a covering stored in housing 1802 can pass through the interior portion of element 1904. Fingers 1902 are oriented radially inward and can be mounted to element 1904, such that they are able to grasp a covering during the upward relative motion (that is, out of the page of FIG. 19A) of a covering through the interior of element 1904. More specifically, fingers 1902 can be configured and/or shaped such that they are more flexible when bending downward (that is, into the page of FIG. 19A) than they are bending upward. In such case, as capping-end-effector 1810 extends substantially-vertically upward, thereby causing the bottom-most covering to pass downward through element 1904, fingers 1902 can bend downward as the physical contact with the bottom-most covering pushes fingers 1902 out of the way. Then, as capping-end-effector 1810 extends substantially-vertically downward, fingers 1902 will return to their neutral positions but will not bend substantially further upward and out of the way, thereby grasping the bottom-most covering. In one or more embodiments, capping-end-effector 1810 can be constructed out of a suitable rubber or plastic material to give fingers 1902 this flexibility.

FIG. 19B depicts an additional embodiment of capping-end-effector 1810. In this embodiment, fingers 1902 can be motorized such that they can rotate out of the way as capping-end-effector 1810 extends substantially-vertically upward such that the bottom-most covering is positioned within the interior of element 1904. Then, fingers 1902 can rotate back inward such that they are grasping the covering, thereby allowing capping-end-effector 1810 to extend substantially-vertically downward with the covering.

In either of these embodiments, capping station 1702 grasps a covering as and/or after capping-end-effector 1810 moves substantially-vertically upward. Then, capping station 1702 applies the covering onto a filled receptacle beneath it as and/or after it extends substantially-vertically downward. This is shown in FIG. 19C, where capping-end-effector 1810 is grasping a covering and is about to press the covering onto the receptacle by continuing to move substantially-vertically downward.

Those of ordinary skill in the art will appreciate that any other method and/or device now known or later created in the art that is configured to grasp a covering and/or to apply that covering onto a receptacle can be incorporated without departing from the scope of the present disclosure.

FIG. 20 illustrates an aerial schematic of an automated dispenser and grinder. That is, FIG. 20 simply shows one potential layout of some physical components discussed above within a casing of the grinding/dispensing device disclosed herein.

As shown, the casing can, in one or more embodiments, contain a plurality of canisters 210, a capping station 1702, a receptacle storage 1502, a packaging system 1002 (FIG. 20 shows the version of packaging system 1002 that is depicted in FIG. 12, but other embodiments can be incorporated), and a drop-off station 2002. As explained above, end-effector 1106 can slide along rail 1202, which itself can slide along rails 1204 and 1206, thus being able to traverse the entire horizontal plane within the casing. Since end-effector 1106 can traverse the entire horizontal plane within the casing, it can obtain a receptacle from receptacle storage 1502, place the receptacle under any of the canisters 210 to receive the type and/or quantity of material ordered by a user, move the filled receptacle to the capping station 1702 to receive a covering, and finally place the filled and covered/packaged receptacle in the drop-off Station 2002 so that the user can obtain it.

Those of ordinary skill in the art will appreciate that FIG. 20 simply shows a potential arrangement of some components within the casing. Thus, not every component discussed above is depicted in FIG. 20, and not every component depicted in FIG. 20 need be included in every embodiment. Those of ordinary skill will also understand that the components of the present invention can be positioned within the casing in whatever physical arrangement is most convenient for a given application.

Figure 21:
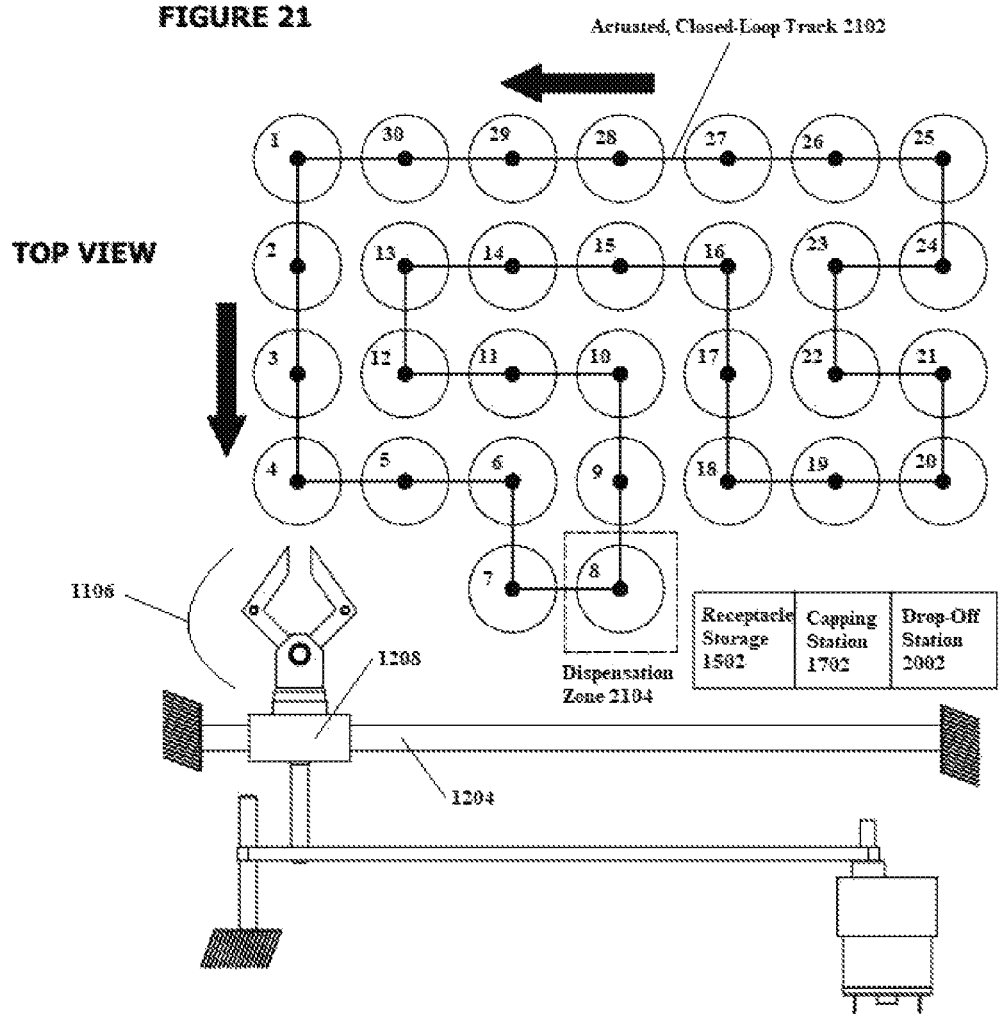
FIG. 21 illustrates an aerial schematic of an automated dispenser and grinder, comprising movable canisters.

FIG. 21 illustrates an aerial schematic of an automated dispenser and grinder, comprising movable canisters.

As shown in FIG. 21, the dispensing and grinding device of the present disclosure can, in one or more embodiments, comprise actuated, closed-loop track 2102. Track 2102 is conceptually analogous to a railroad track; that is, each canister 210 is movably attached to track 2102. This movement can be actuated by electric motors or by any other method and/or device now known or later created in the art that can allow canisters 210 to move along track 2102. For example, each canister 210 can be attached to a central rope, chain, and/or cable that is pulled/fed along track 2102 by electric actuators. As another example, each canister 210 can be outfitted with its own actuated wheels so as to independently move along track 2102. Those of ordinary skill will understand that other examples exist.

In one or more embodiments, canisters 210 hang vertically-downward from track 2102, such that each canister 210 can move along track 2102 while keeping the areas beneath the canisters 210 clear. This allows the packaging system 1002 to move freely in the horizontal plane beneath canisters 210.

In one or more embodiments, even though canisters 210 can move along track 2102, the order of the canisters 210 does not change. For example, if a cinnamon canister is positioned directly "in front of" a ginger canister along track 2102, these canisters will maintain that relative positioning regardless of their absolute locations along track 2102. This allows control system 206 to keep track of the positions and identities of each canister 210 (and thus the material to be dispensed by each canister 210). Moreover, those of ordinary skill will understand that track 2102 can be operated and/or controlled by control system 206.

Although FIG. 21 depicts a particular shape of track 2102, those of ordinary skill in the art will appreciate that track 2102 can be shaped/arranged in any manner to suit a given application.

Additionally, as shown, packaging system 1002 in this embodiment can comprise end-effector 1106, rail 1204, and sliding sheath 1208. In such case, packaging system 1002 would be able to traverse only one linear dimension (that is, along the longitudinal axis of rail 1204) within the casing. However, the other components (e.g. receptacle storage 1502, capping station 1702, and drop-off station 2002) can be positioned along the length of rail 1204 such that packaging system 1002 can still place a receptacle beneath or in each of these components. The benefit of this embodiment is that packaging system 1002 need not be able to traverse the entire horizontal plane, thereby resulting in saved construction and maintenance expenses.

Moreover, if packaging system 1002 cannot traverse the entire plane, a dispensation zone 2104 can be included. In one or more embodiments, dispensation zone 2104 is simply a designated area, aligned with the other components along the length of rail 1204, where any selected canister 210 will dispense material. For example, if the user selects cumin, track 2102 actuates until the cumin canister 210 is positioned above the dispensation zone 2104. Additionally, packaging system 1002 will obtain a receptacle from receptacle storage 1502 and position it in the dispensation zone 2104. Once both the cumin canister 210 and the receptacle are in the dispensation zone 2104, the cumin canister 210 will measure and grind material and dispense the ground material into the receptacle. Packaging system 1002 can then move the filled receptacle to the capping station 1702 to receive a covering and then to the drop-off station 2002 to be obtained by the user.

Those of ordinary skill in the art will appreciate that arrangements other than those depicted in FIG. 21 are within the scope of the present disclosure.

Figure 22:
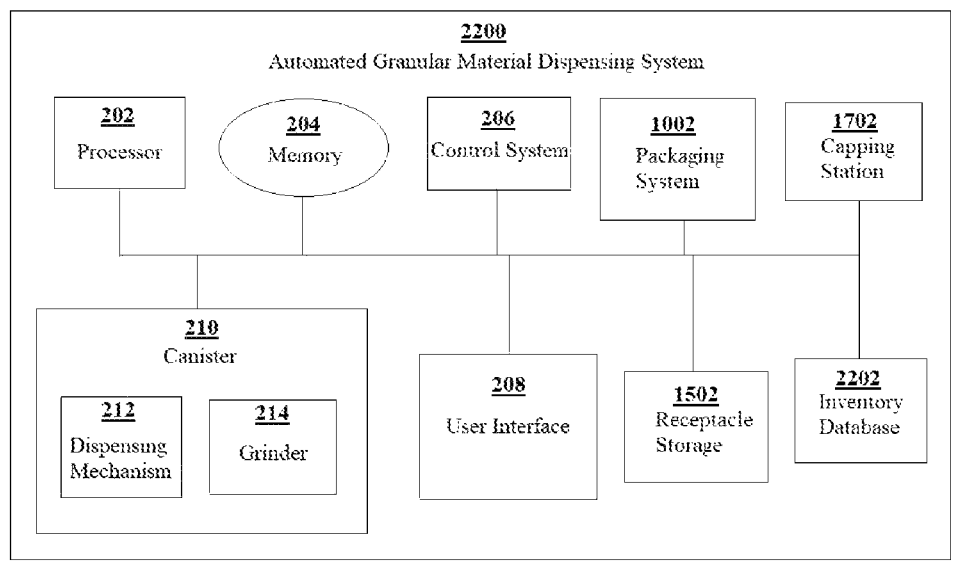
FIG. 22 illustrates a schematic block diagram of an automated dispenser and grinder, comprising an inventory database.

FIG. 22 illustrates a schematic block diagram of an automated dispenser and grinder, comprising an inventory database.

As shown, Automated Granular Material Dispensing System 2200 (hereafter referred to as "device 2200") can comprise all the components of device 1700, in addition to inventory database 2202. Inventory database 2202 can store inventory information of device 2200. That is, inventory database 2202 can electronically record the types and/or quantities of materials available for dispensing in each canister 210 of device 2200. For example, if a grinding and dispensing apparatus is outfitted with multiple separate canisters, with each canister containing a spice, inventory database 2202 can store for each canister, as electronic information, the position of the canister within the casing, the identity of the spice within the canister, and/or the amount of spice remaining within the canister.

Regarding canister position, inventory database 2202 can record the location of each canister 210. During installation and/or maintenance, inventory database 2202 can receive input from the maintenance entity indicating the location of each canister 210 within the casing of the device (where each canister 210 is carrying a known material for dispensation). In some embodiments discussed above, each canister 210 is stationary, and so inventory database 2202 would receive initial location information regarding each canister 210 and need not continuously update the position of each canister 210. In the embodiments depicted in FIG. 21, however, each canister 210 can change position within the dispensing and grinding device. In such case, inventory database 2202 would actively calculate the position of each canister 210 after a movement of known distance and/or duration along track 2102. As those of ordinary skill in the art will appreciate, since the shape of track 2102, the order of the canisters 210 along track 2102, the initial location of each canister 210 along track 2102, and the distance moved along track 2102 would be known, inventory database 2202 could simply compute the new location of each canister 210 as a function of its prior position and the duration/extent of actuation along track 2102.

In some embodiments, simple modular arithmetic can be used by inventory database 2202 to determine the new location of each canister 210. As an example, track 2102 in FIG. 21 is depicted as having thirty separate positions (for thirty separate canisters 210) along its length, each position labeled with a position number ranging, in order, from 1 to 30. So, if the cinnamon canister 210 begins in position 1, control system 206 could access inventory database 2202 to learn that cinnamon canister 210 is at position 1 and that the dispensation zone 2104 is at position 8. Control system 206 would then actuate track 2102 to move all canisters 210 seven spaces forward, putting cinnamon canister 210 in the dispensation zone 2104. Inventory database 2202 would then update the locations of each canister 210 by simply adding seven spaces to the prior location of each canister 210 using modular arithmetic. Thus, the new location of the canister 210 that was in position 1 is position 8 (since 1 mod 30+7 mod 30=8 mod 30=8), the new location of the canister 210 that was in position 17 is position 24 (since 17 mod 30+7 mod 30=24 mod 30=24), and the new location of the canister 210 that was in position 26 is position 3 (since 26 mod 30+7 mod 30=33 mod 30=3).

Regarding the identify of the spice/material within each canister 210, the maintenance entity could simply input this information into inventory database 2202 during installation and/or maintenance. In other embodiments, device 2200 can further comprise special sensors (e.g. RFID sensors, bar-code readers, magnetic strip sensors, and so on) to detect unique markings (e.g. RFID tags, bar-codes, magnetic strips, and so on) on each canister 210, wherein each marking denotes the contents of the canister 210.

Finally, regarding the amount of material remaining in each canister 210, inventory database 2202 can simply calculate the amount of material remaining in each canister 210 by subtracting the total amount dispensed from the initial amount inputted by the maintenance entity. For example, if canister 210 begins with 30 tablespoons of ginger, and three different users order 3 tablespoons, 2 tablespoons, and then 5 tablespoons of ginger, inventory database 2202 can determine that it has 27 tablespoons remaining after the first order (30−3=27), 25 tablespoons remaining after the second order (27−2=25), and 20 tablespoons remaining after the final order (25−5=20). In other embodiments, device 2200 can include weight sensors which can be used (in conjunction with the known densities of the stored materials in device 2200) to determine the remaining volumes of materials available to be dispensed in each canister 210.

In other embodiments, inventory database 2202 can keep track of the time elapsed since a canister 210 had last been filled with a granular material. This would allow inventory database to keep track of how fresh the inventory of device 2200 is.

Those of ordinary skill will also understand that inventory database 2202 can be operated and/or controlled by control system 206.

Figure 23:
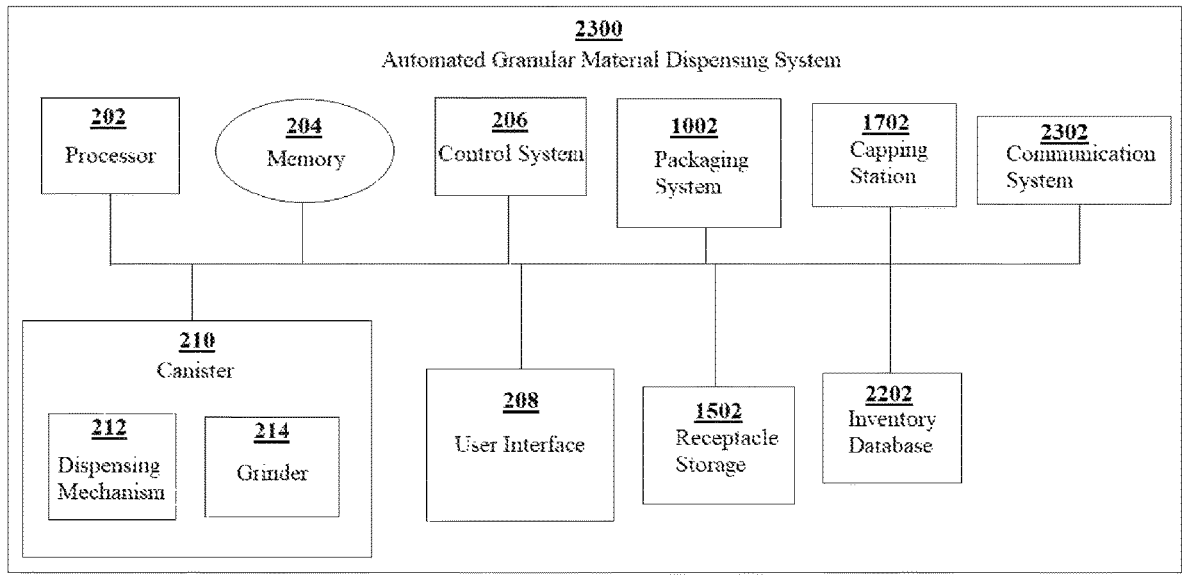
FIG. 23 illustrates a schematic block diagram of an automated dispenser and grinder, comprising a communication system.

FIG. 23 illustrates a schematic block diagram of an automated dispenser and grinder, comprising a communication system.

As shown, Automated Granular Material Dispensing System 2300 (hereafter referred to as "device 2300") can comprise all the components of device 2200, in addition to communication system 2302. In one or more embodiments, communication system 2302 can be configured to facilitate internet connectivity, such as via a wireless internet connection or a wired internet connection (e.g. Ethernet). Those of ordinary skill will appreciate that any other method and/or device now known or later created in the art that can facilitate internet connectivity can be incorporated without departing from the scope of the present disclosure. With internet connectivity, a user can access and interact with device 2300 remotely via a website or mobile application. Thus, the user can remotely access inventory database 2202 to check the inventory information of device 2300, including the types and/or amounts of granular materials that are available for dispensation. Moreover, the user can place their order for desired types and/or quantities of materials by remotely interacting with user interface 208.

In one or more embodiments, communication system 2302 can send an alert, notification, signal and/or message to a designated maintenance entity when inventory database 2202 indicates that an inventory of at least one canister 210 in device 2300 has been depleted. This signal and/or message can be in the form of an email, a text message, or any other method and/or device now known or later created in the art that can alert a maintenance entity of depleted inventory. This will help to prevent device 2300 from going long periods of time without being refilled.

Those of ordinary skill will appreciate that communication system 2302 can be operated and/or controlled by control system 206.

Figure 24:
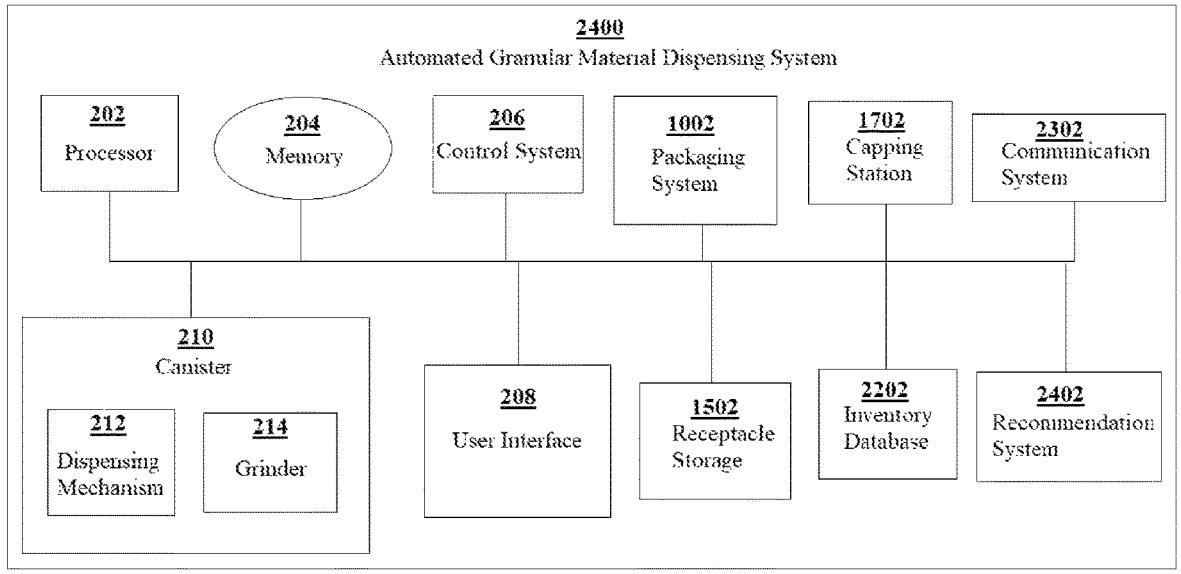
FIG. 24 illustrates a schematic block diagram of an automated dispenser and grinder, comprising a recommendation system.

FIG. 24 illustrates a schematic block diagram of an automated dispenser and grinder, comprising a recommendation system.

As shown, Automated Granular Material Dispensing System 2400 (hereafter referred to as "device 2400") can comprise all the components of device 2300, in addition to recommendation system 2402. In one or more embodiments, recommendation system 2402 can recommend to a user at least one recipe which calls for at least one of the granular materials in device 2400. The recipe may be for a blend of granular materials, or it may be a recipe for an entire meal, a seasoning/garnishment for which calls for at least one of the granular materials in device 2400. Recommendation system 2402, in other embodiments, can recommend to the user a substitute granular material if a granular material desired by the user is not currently in stock in device 2400. This recommendation functionality assists the user in making decisions if they are unsure of what spices they desire or need. Additionally, this recommendation functionality can be used to prioritize a retailer's goals. For example, if a grocery store has a device 2400 and an inventory of rotisserie chicken that it needs to deplete, the store can program recommendation system 2402 to recommend chicken seasonings to users. Recommendation system 2402 can contain stored information (e.g. recipes, substitutes, retailer needs and/or goals, and so on). In other embodiments, recommendation system 2402 can make recommendations based on information retrieved from the internet via communication system 2302.

Figure 25:
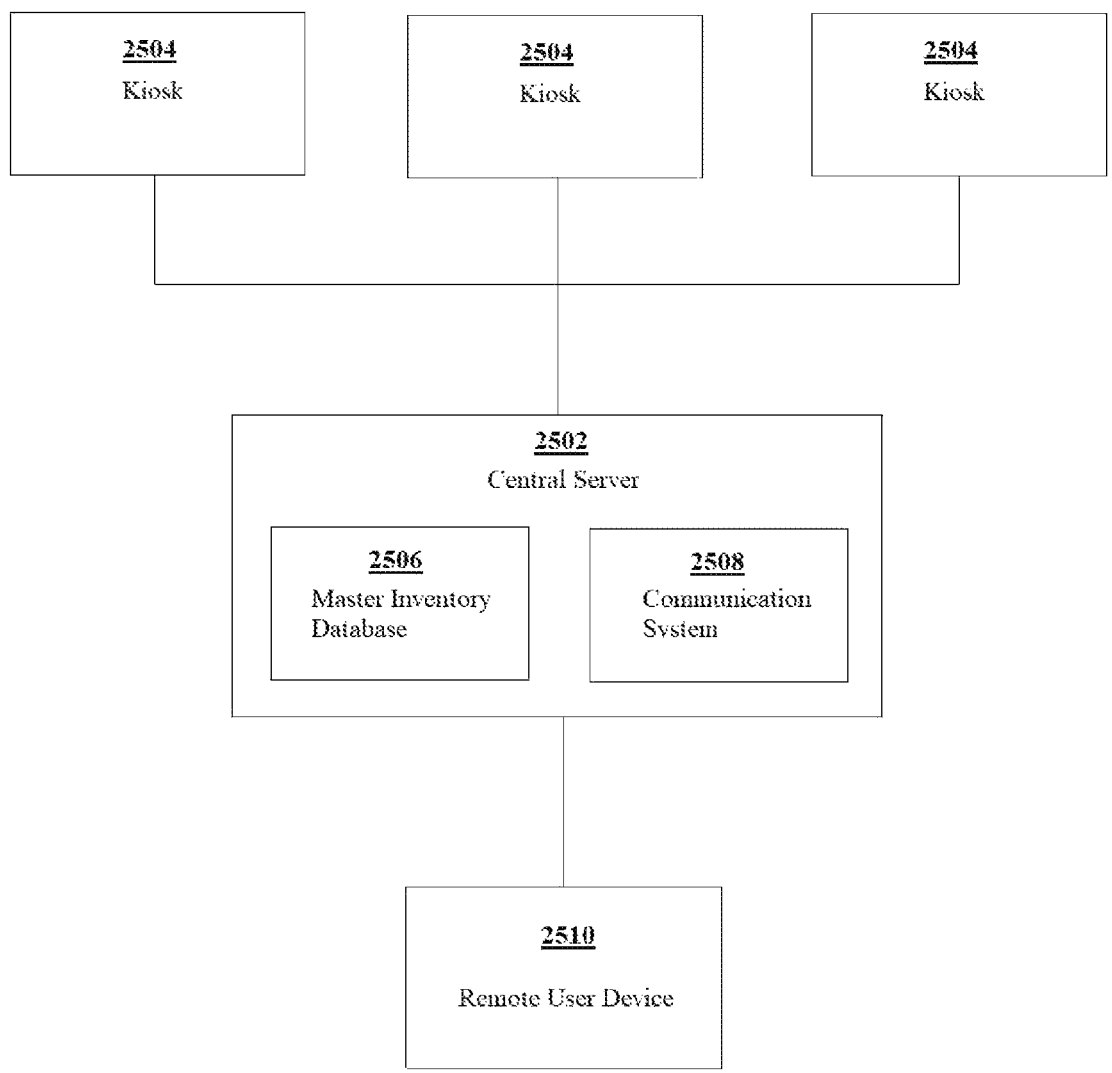
FIG. 25 illustrates a schematic block diagram of an interconnected system of automated dispensers and grinders.

FIG. 25 illustrates a schematic block diagram of an interconnected system of automated dispensers and grinders.

As shown, Interconnected System of Kiosks 2500 (hereafter referred to as "system 2500") can comprise a central server 2502, a plurality of kiosks 2504, a master inventory database 2506, and a communication system 2508. The kiosks 2504 are remote from each other and are in communication (via a wired or wireless internet connection, a local area network, a wide area network, and so on) with the central server 2502. Any other method and/or device now known or later created in the art that can allow each kiosk 2504 to communicate remotely with central server 2502 does not depart from the scope of the present disclosure. Master inventory database 2506 can store inventory information (e.g. types and quantities of materials available for dispensation) for each kiosk 2504, just like inventory database 2202 above. Moreover, communication system 2508 can be configured to facilitate internet connectivity, just like communication system 2302 above. This internet connectivity allows a user to remotely access central server 2502 (such as by a website, a mobile application, remote user device 2510, and so on). So, the user can remotely access master inventory database 2506 to check the available inventory of the entire system of interconnected kiosks 2504 at once without having to visit each kiosk 2504 individually. The user can also remotely place their order for desired types and/or quantities of granular materials to be dispensed at a chosen kiosk 2504.

Each kiosk 2504 can comprise any of the aforementioned embodiments of an automated dispenser and grinder. For example, each kiosk 2504 can comprise any combination of a casing to house its components, a memory 204 for storing computer-executable instructions, a processor 202 for executing those instructions, one or more canisters 210 each comprising a dispensing mechanism 212 and a grinder 214, a user interface 208, a packaging system 1002, a receptacle storage 1502, a capping station 1702, an inventory database 2202, a communication system 2302, and/or a recommendation system 2402.

Moreover, the communication system 2508 can alert a designated maintenance entity when an inventory of any one of the plurality of kiosks 2504 is depleted, just as described in conjunction with communication system 2302 above.

FIG. 26 illustrates a flow chart diagram of a remote ordering and dispensation process. At step 2602, a user remotely accesses the central server 2502 (via the internet, cloud, local area network, wide area network, and so on). Again, this communication is facilitated by communication system 2508. At step 2604, the user accesses the master inventory database 2506 to check the available inventory at each kiosk 2504 in the entire interconnected system. At step 2606, the user then remotely designates a kiosk 2504 from which he/she would like to order, and then places his/her order (e.g. a type and/or quantity of material to be dispensed). Lastly, at step 2608, the chosen kiosk 2504 grinds and dispenses the user's order, and the user travels to the physical location of kiosk 2504 to obtain it.

It will be appreciated by those having ordinary skill in the art that the embodiments discussed above are for exemplary purposes and do not constrain the scope of the present disclosure in any way. So, other variations (e.g. more or fewer components, different combinations of components, and so on) of the embodiments described herein may be implemented without departing from the scope of the present disclosure.

What is claimed is:

1. A device for automatically grinding and dispensing granular material, the device comprising:
   a casing;

a memory for storing computer-executable instructions;
a processor for executing the computer-executable instructions;
a user interface that is attached to the casing and that receives a user input identifying a type and quantity of material;
at least one canister within the casing for storing, grinding, and dispensing the type and quantity of material, wherein the at least one canister comprises:
  a dispensing mechanism that measures and dispenses the type and quantity of material; and
  a grinder that receives the type and quantity of material from the dispensing mechanism and grinds the type and quantity of material; and
a control system that controls operation of the user interface and the at least one canister;
wherein execution of the computer-executable instructions by the processor causes the control system to actuate the user interface to receive the user input identifying the type and quantity of material;
wherein receipt of the user input causes the control system to actuate the dispensing mechanism to measure and dispense the type and quantity of material into the grinder and to actuate the grinder to grind the type and quantity of material;
wherein the dispensing mechanism comprises:
  a metering plate configured to rotate and having a top face, a bottom face, and at least one extruded hole extending from the top face to the bottom face, thereby forming a pocket of known volume, wherein the material can enter the pocket through the top face;
  a skimming plate disposed above the metering plate and configured to skim excess material from the pocket as the pocket moves underneath the skimming plate as the metering plate rotates, thereby isolating within the pocket an amount of material having a volume equal to the known volume of the pocket; and
  a blocking plate disposed below the metering plate and having a hole configured to align with the pocket while the pocket is underneath the skimming plate, thereby allowing the isolated amount of material to exit the pocket through the bottom face without having additional material enter the pocket through the top face; and
wherein receipt of the user input causes the control system to rotate the metering plate to measure and dispense the type and quantity of material into the grinder.

2. The device of claim 1, further comprising:
a packaging system disposed within the casing and configured to position a receptacle beneath the at least one canister such that the receptacle receives the type and quantity of material after grinding, wherein operation of the packaging system is controlled by the control system, such that execution of the computer-executable instructions causes the control system to actuate the packaging system upon receipt of the user input, thereby causing the packaging system to place the receptacle beneath the at least one canister to receive the type and quantity of material after grinding.

3. The device of claim 2, wherein the packaging system comprises:
a linear rail;
an extendable member having a first end and a second end, wherein the first end is slidably attached to the linear rail such that the linear rail and the extendable member are orthogonal and such that the extendable member can slide along a longitudinal axis of the linear rail, wherein the extendable member is configured to extend and retract along a longitudinal axis of the extendable member; and
an end-effector attached to the second end of the extendable member, wherein the end-effector is configured to grasp the receptacle and to rise and lower in a vertical direction;
wherein, upon actuation by the control system, the end-effector obtains the receptacle and places it beneath the at least one canister by sliding along the linear rail and traveling along the longitudinal axis of the extendable member.

4. The device of claim 2, wherein the packaging system comprises:
a first linear rail;
an end-effector slidably attached to the first linear rail such that the end-effector can slide along a longitudinal axis of the first linear rail, wherein the end-effector is configured to grasp the receptacle and to rise and lower in a vertical direction; and
a second linear rail, wherein an end of the first linear rail is slidably attached to the second linear rail such that the first linear rail and the second linear rail are orthogonal and such that the first linear rail can slide along a longitudinal axis of the second linear rail;
wherein, upon actuation by the control system, the end-effector obtains the receptacle and places it beneath the at least one canister by sliding along the linear rails.

5. The device of claim 2, further comprising:
a receptacle-storage disposed within the casing and configured to house a plurality of receptacles and from which the packaging system can obtain at least one of the plurality of receptacles to position beneath the at least one canister for receipt of the type and quantity of material.

6. The device of claim 2, further comprising:
a capping station disposed within the casing and configured to apply a covering to the receptacle after the receptacle receives the type and quantity of material, wherein operation of the capping station is controlled by the control system, such that execution of the computer-executable instructions causes the control system to actuate the packaging system, thereby causing the packaging system to move the receptacle after the receptacle receives the type and quantity of material after grinding to beneath the capping station, and to actuate the capping station, thereby causing the capping station to apply a covering to the receptacle.

7. The device of claim 6, wherein the capping station comprises:
a vertical stacking member configured to house a plurality of coverings; and
a cap-applicator driven, by an actuator, in a vertical direction between a first position and a second position, wherein the cap-applicator is configured to obtain a covering from the stacking member in the first position and to apply the covering to the receptacle in the second position by pressing the covering onto the receptacle.

8. The device of claim 1, further comprising:
an inventory database configured to store inventory information of the device, wherein operation of the inventory database is controlled by the control system, such that execution of the computer-executable instructions causes the control system to actuate the inventory database upon receipt of the user input, thereby causing the control system to verify that the type and quantity of material identified in the user input is in stock in the device.

9. The device of claim 8, further comprising:
a communication system configured to facilitate internet connectivity, such that a user can remotely access the inventory database to check the inventory information of the device, and such that the device can remotely accept user input identifying the type and quantity of material, wherein operation of the communication system is controlled by the control system, such that execution of the computer-executable instructions causes the control system to actuate the communication system, thereby causing an internet connection to be facilitated.

10. The device of claim 8, further comprising:
a communication system configured to alert a designated maintenance entity when the inventory database indicates that an inventory of the device is depleted, wherein operation of the communication system is controlled by the control system, such that execution of the computer-executable instructions causes the control system to actuate the communication system when the inventory database indicates that the inventory of the device is depleted, thereby causing the communication system to alert the designated maintenance entity.

11. The device of claim 8, further comprising:
a recommendation system configured to recommend to a user at least one recipe, wherein the at least one recipe calls for at least one granular material in an inventory of the device, and wherein operation of the recommendation system is controlled by the control system, such that execution of the computer-executable instructions causes the control system to actuate the recommendation system when a user accesses the user interface and before the user interface receives the user input, thereby causing the recommendation system to recommend to a user at least one recipe calling for at least one granular material in the inventory of the device.

12. A device for automatically grinding and dispensing granular material, the device comprising:
a casing;
a memory for storing computer-executable instructions;
a processor for executing the computer-executable instructions;
a user interface that is attached to the casing and that receives a user input identifying a type and quantity of material;
at least one canister within the casing for storing, grinding, and dispensing the type and quantity of material, wherein the at least one canister comprises:
a dispensing mechanism that measures and dispenses the type and quantity of material; and
a grinder that receives the type and quantity of material from the dispensing mechanism and grinds the type and quantity of material;
a control system that controls operation of the user interface and the at least one canister;
a plurality of canisters within the casing including the at least one canister, wherein each canister is configured to store, grind, and dispense one of a plurality of materials; and
an actuated, closed-loop track within the casing, wherein all the canisters are attached to the track such that the canisters can move along the track, thereby allowing the canisters to change locations within the casing without changing their order along the track;
wherein execution of the computer-executable instructions by the processor causes the control system to actuate the user interface to receive the user input identifying the type and quantity of material, and wherein receipt of the user input causes the control system to actuate the dispensing mechanism to measure and dispense the type and quantity of material into the grinder and to actuate the grinder to grind the type and quantity of material.

* * * * *